United States Patent [19]
Favor et al.

[11] Patent Number: 5,511,175
[45] Date of Patent: Apr. 23, 1996

[54] METHOD AN APPARATUS FOR STORE-INTO-INSTRUCTION-STREAM DETECTION AND MAINTAINING BRANCH PREDICTION CACHE CONSISTENCY

[75] Inventors: John G. Favor, San Jose; Korbin Van Dyke; David R. Stiles, Sunnyvale, all of Calif.

[73] Assignee: NexGen, Inc., Milpitas, Calif.

[21] Appl. No.: 326,409

[22] Filed: Oct. 20, 1994

Related U.S. Application Data

[63] Continuation of Ser. No. 42,298, Apr. 2, 1993, abandoned, and Ser. No. 485,312, Feb. 26, 1990, Pat. No. 5,226,130.

[51] Int. Cl.$^6$ ................................. G06F 9/38; G06F 9/42
[52] U.S. Cl. ................. 395/375; 364/243.42; 364/244.3; 364/261; 364/262.4; 364/265.6; 364/266.3; 364/285.2; 364/231.8; 364/DIG. 1
[58] Field of Search ............................................. 395/375

[56] References Cited

U.S. PATENT DOCUMENTS

| | | |
|---|---|---|
| 4,295,193 | 10/1981 | Pomerene . |
| 4,442,488 | 4/1984 | Hall . |
| 4,594,659 | 6/1986 | Guenther et al. . |
| 4,604,691 | 8/1986 | Akagi . |
| 4,679,141 | 7/1987 | Pomerene et al. . |
| 4,722,050 | 1/1988 | Lee et al. . |
| 4,775,955 | 10/1988 | Liu . |
| 4,777,587 | 10/1988 | Case et al. . |
| 4,777,594 | 10/1988 | Jones et al. . |

(List continued on next page.)

OTHER PUBLICATIONS

"The Architecture of Pipelined Computers", Peter M. Kogge, Hemisphere Publishing Company 1981.
"Pipeline Architecture", C. V. Ramamoorthy et al., University of Illinois, Computing Surveys, vol. 9, No. 1, Mar. 1977.
"Coding Guidelines for Pipelined Processors", James W. Rymarczyk, IBM Corp., NY., 1982 ACM 0-89791-066-4 82/03/0012.
David R. Stiles and Harold L. McFarland; "Pipeline Control for a Single Cycle VLSI Implementation of a Complex Instruction Set Computer"; Computer Society of the IEEE; pp. 504–508.
A. Thampy Thomas; "A Single Cycle VLSI CISC-Based Workstation: System Overview and Performance Characteristics"; Computer Society of the IEEE; pp. 500–503.
Atiq Raza; "Technology Constraints on VLSI Processor Implementation"; Computer Society of the Thirty-Fourth IEEE; pp. 509–512.

*Primary Examiner*—Kevin J. Teska
*Assistant Examiner*—Ayni Mohahamed
*Attorney, Agent, or Firm*—Townsend and Townsend and Crew

[57] ABSTRACT

The present invention provides for the updating of both the instructions in a branch prediction cache and instructions recently provided to an instruction pipeline from the cache when an instruction being executed attempts to change such instructions ("Store-Into-Instruction-Stream"). The branch prediction cache (BPC) includes a tag identifying the address of instructions causing a branch, a record of the target address which was branched to on the last occurrence of each branch instruction, and a copy of the first several instructions beginning at this target address. A separate instruction cache is provided for normal execution of instructions, and all of the instructions written into the branch prediction cache from the system bus must also be stored in the instruction cache. The instruction cache monitors the system bus for attempts to write to the address of an instruction contained in the instruction cache. Upon such a detection, that entry in the instruction cache is invalidated, and the corresponding entry in the branch prediction cache is invalidated. A subsequent attempt to use an instruction in the branch prediction cache which has been invalidated will detect that it is not valid, and will instead go to main memory to fetch the instruction, where it has been modified.

11 Claims, 14 Drawing Sheets

U.S. PATENT DOCUMENTS

| | | |
|---|---|---|
| 4,796,175 | 1/1989 | Matsuo et al. . |
| 4,802,113 | 1/1989 | Onishi et al. . |
| 4,827,402 | 5/1989 | Wada . |
| 4,847,753 | 6/1989 | Matsuo et al. . |
| 4,853,840 | 8/1989 | Shibuya . |
| 4,858,104 | 8/1989 | Matsuo et al. . |
| 4,860,199 | 8/1989 | Langendorf et al. . |
| 4,881,170 | 11/1989 | Morisada . |
| 4,882,673 | 11/1989 | Witt . |
| 4,894,772 | 1/1990 | Langendorf . |
| 4,926,323 | 5/1990 | Baror et al. . |
| 4,933,837 | 6/1990 | Freidin . |
| 4,942,520 | 7/1990 | Langendorf . |
| 4,943,908 | 7/1990 | Emma et al. . |
| 4,984,154 | 1/1991 | Hanatani et al. . |
| 4,991,078 | 2/1991 | Wilhelm et al. . |
| 4,991,080 | 2/1991 | Emma et al. . |
| 5,072,364 | 12/1991 | Jardine et al. . |
| 5,136,696 | 8/1992 | Beckwith et al. . |
| 5,136,697 | 8/1992 | Johnson . |
| 5,142,634 | 8/1992 | Fite et al. . |
| 5,237,666 | 8/1993 | Suzuki et al. . |
| 5,355,457 | 10/1994 | Shebanow et al. . |

FIG._1.

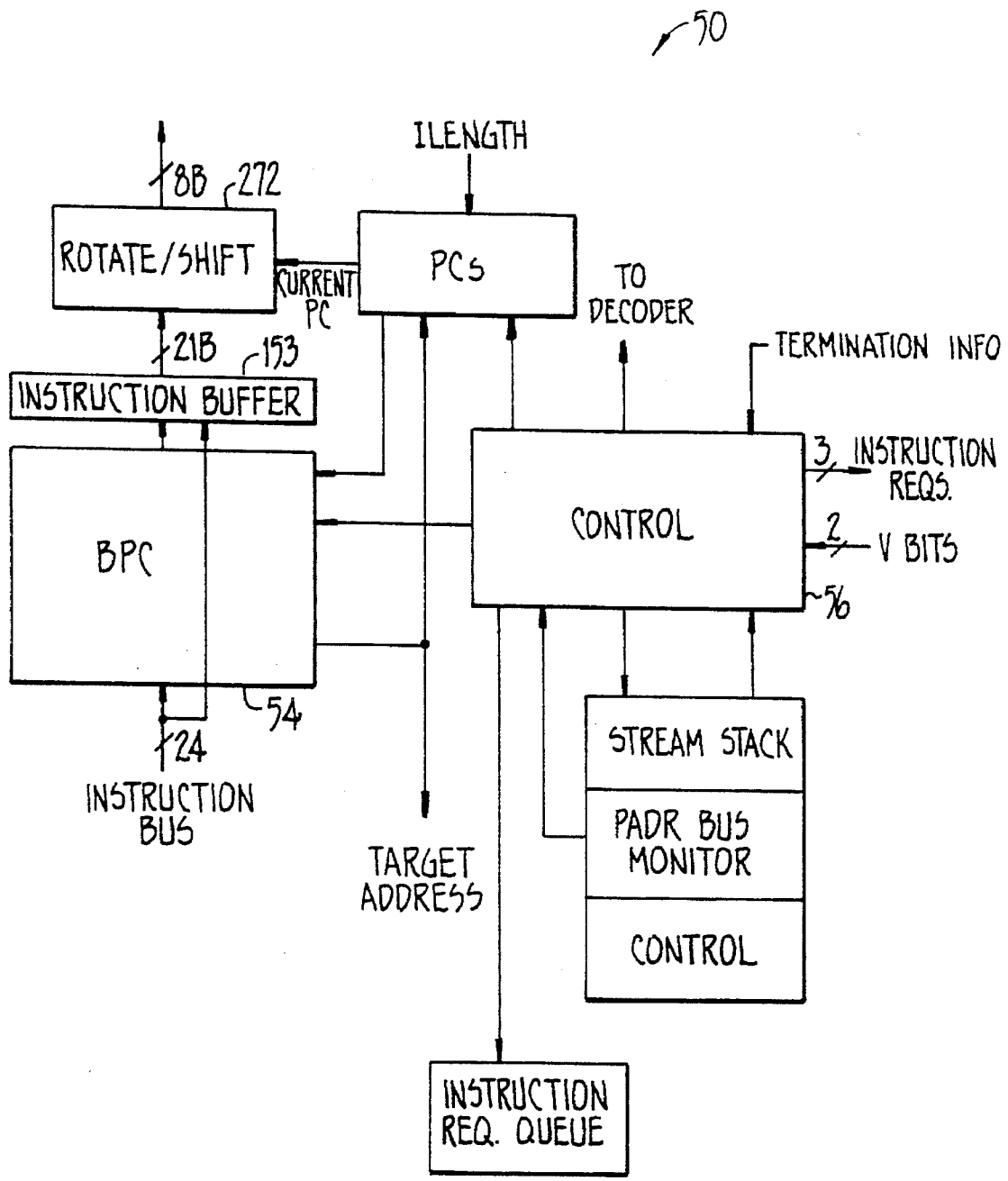
FIG._3.

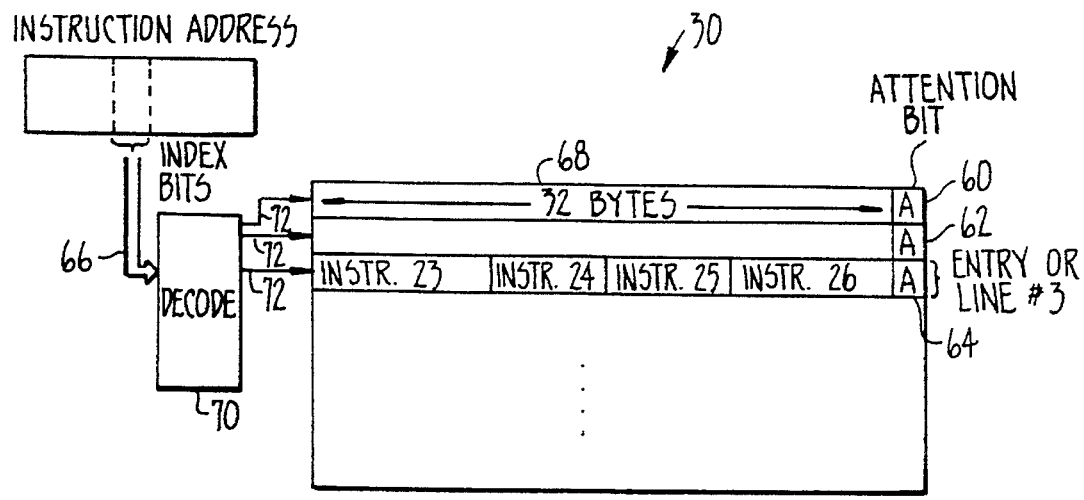
FIG._4.
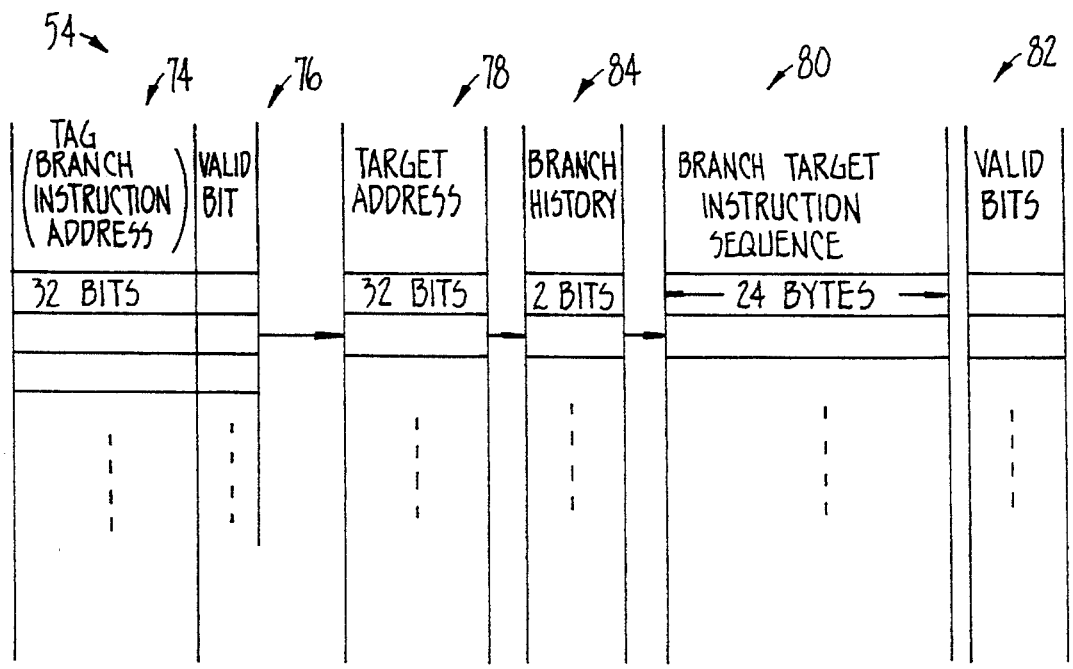
FIG._5.

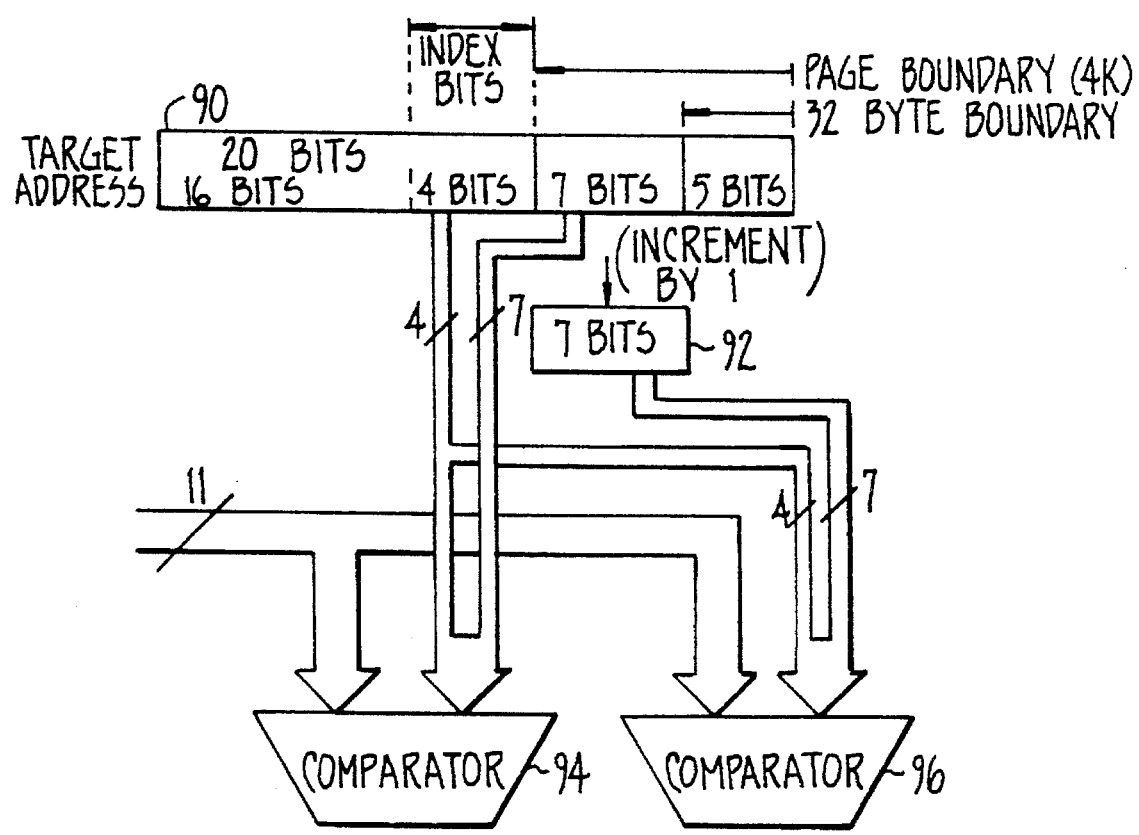
FIG._6.

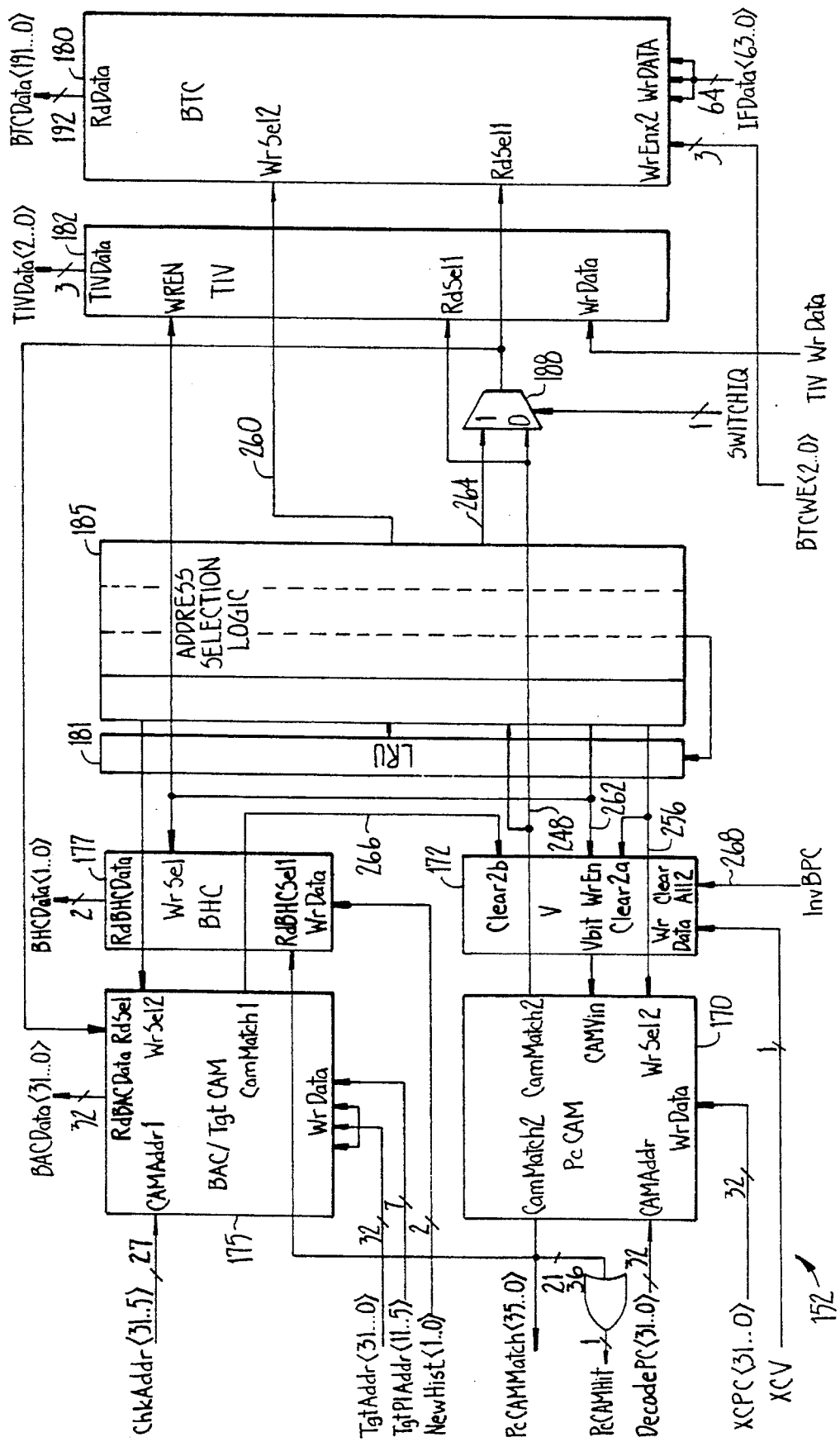
FIG._7.

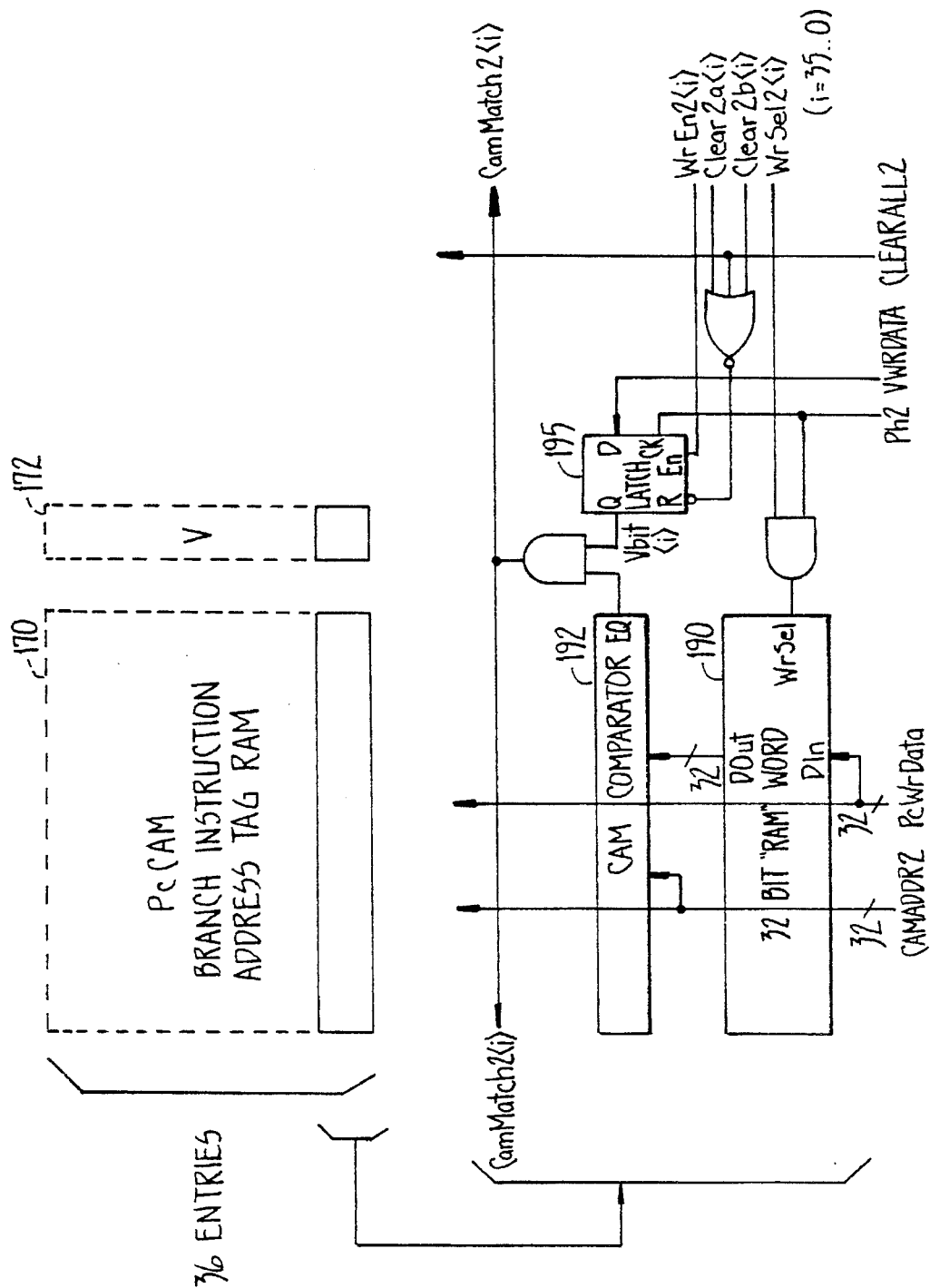
FIG._8.

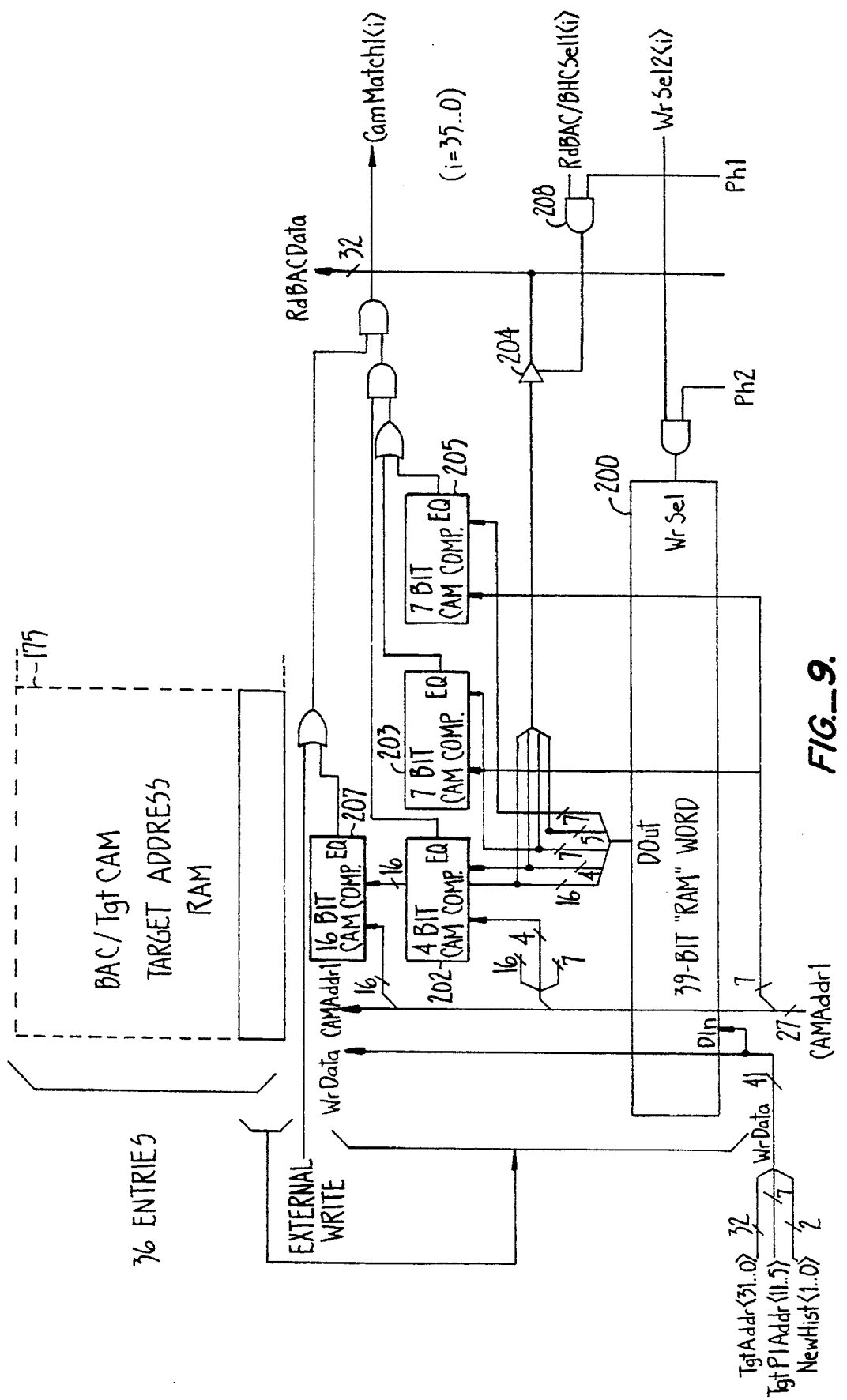
FIG._9.

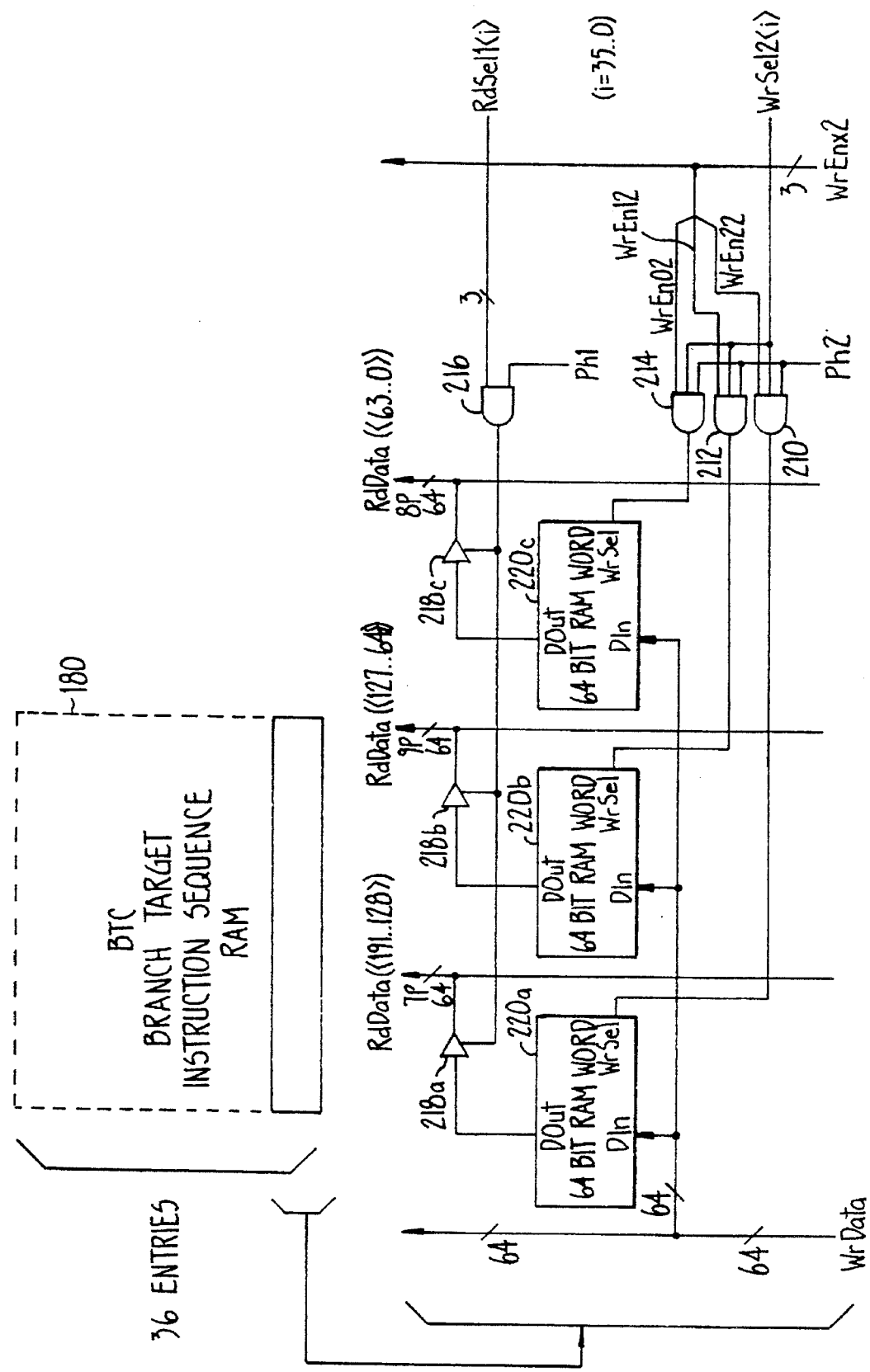
FIG._10.

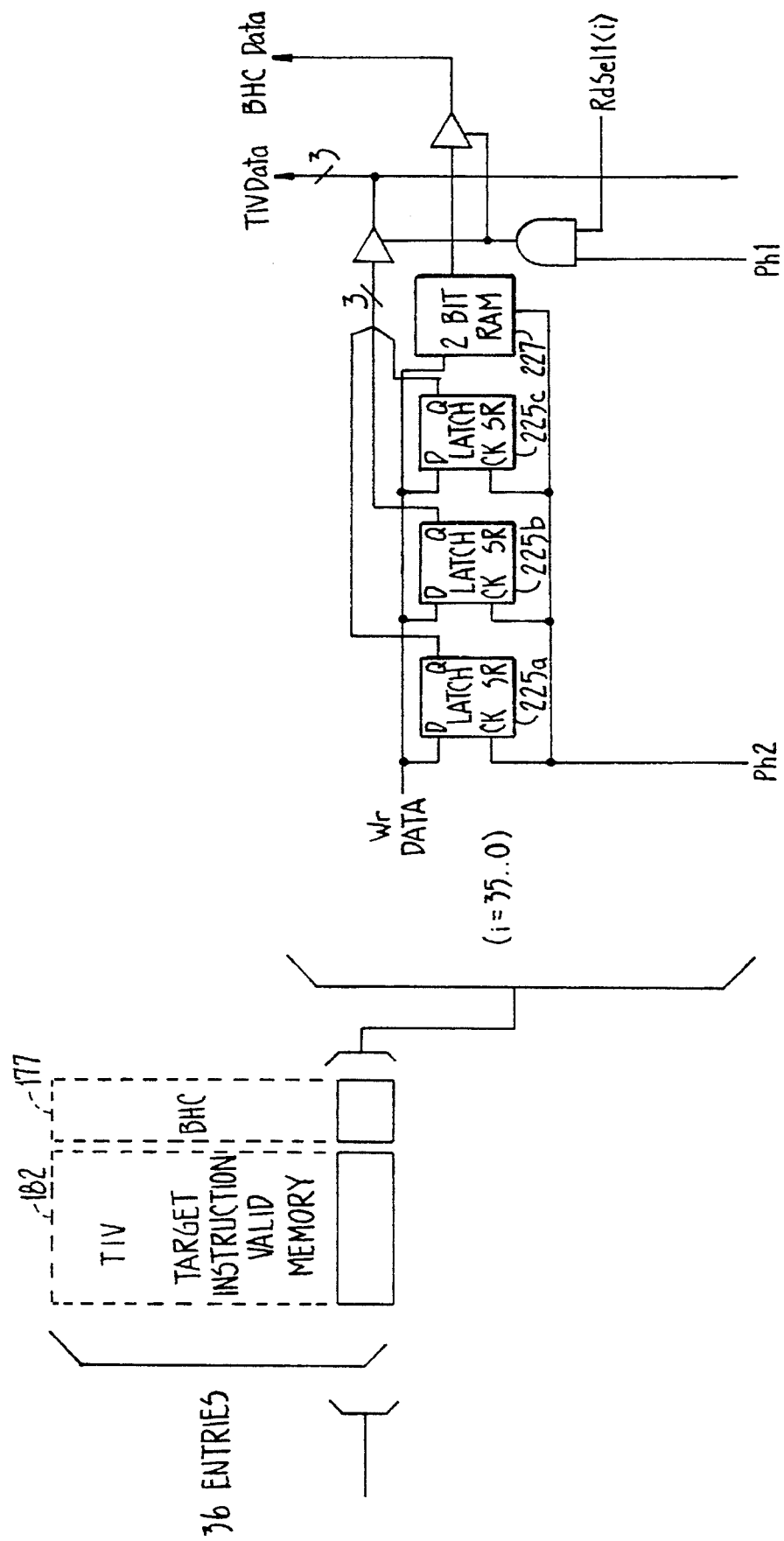
FIG._11.

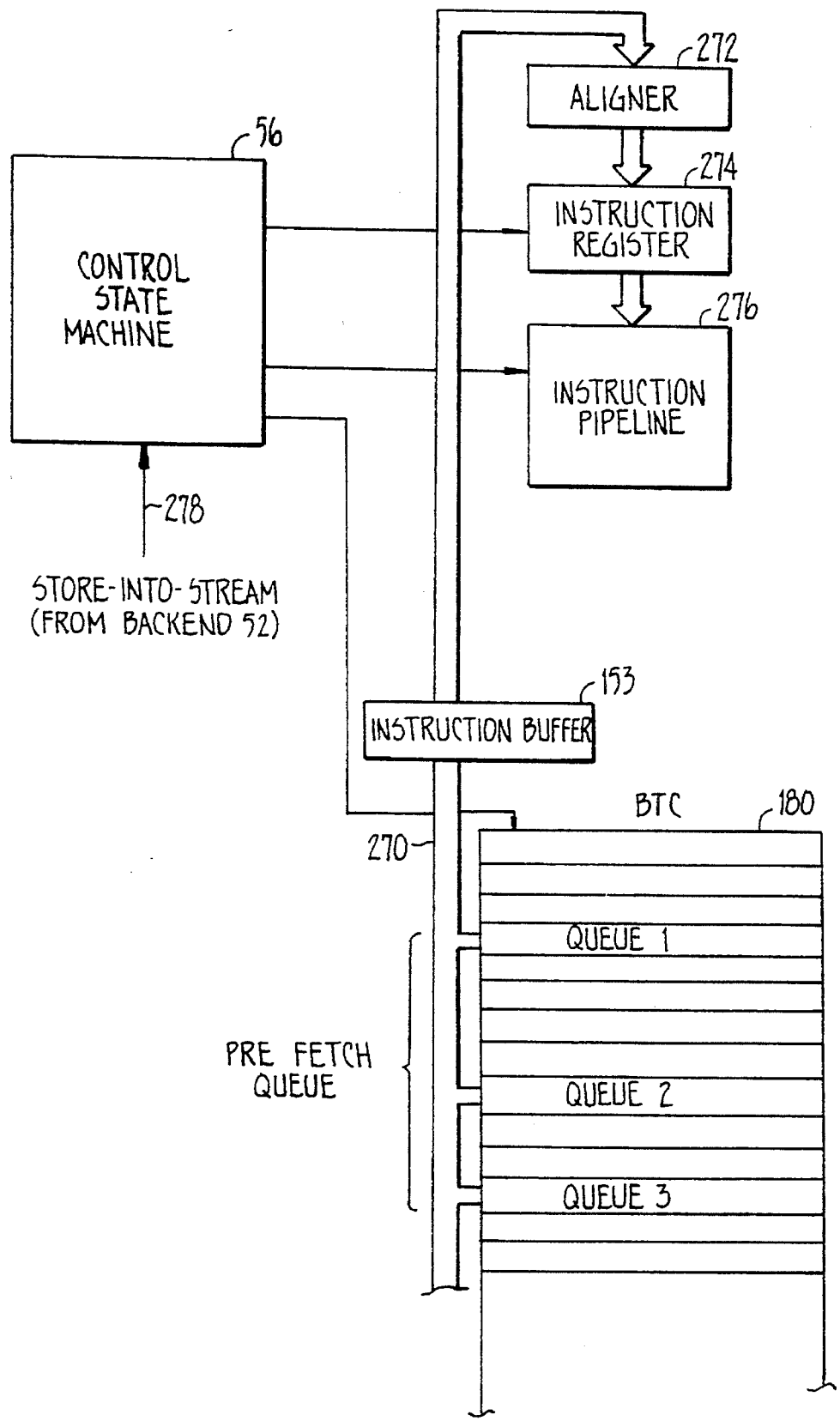
FIG._13.

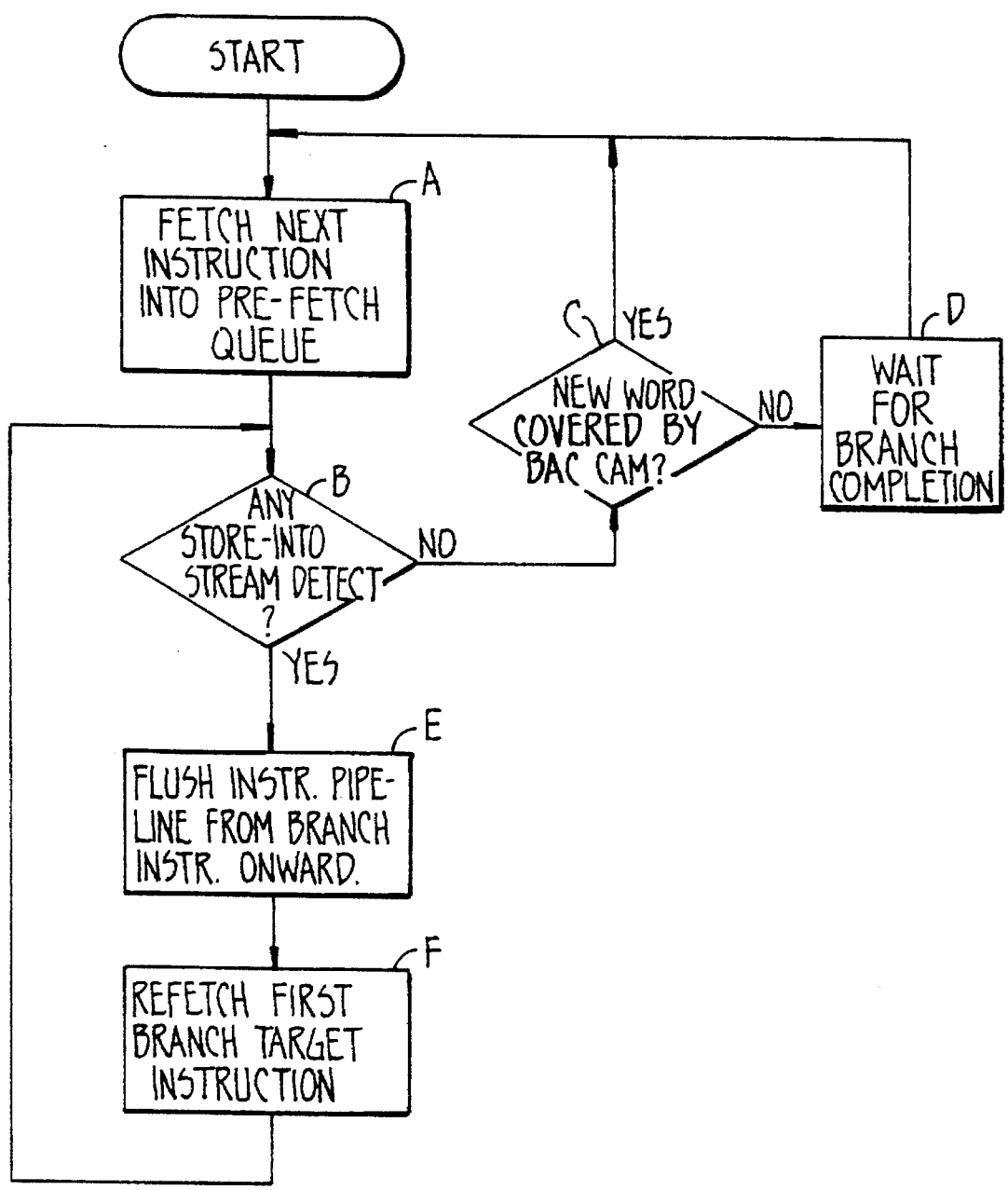
FIG._14.

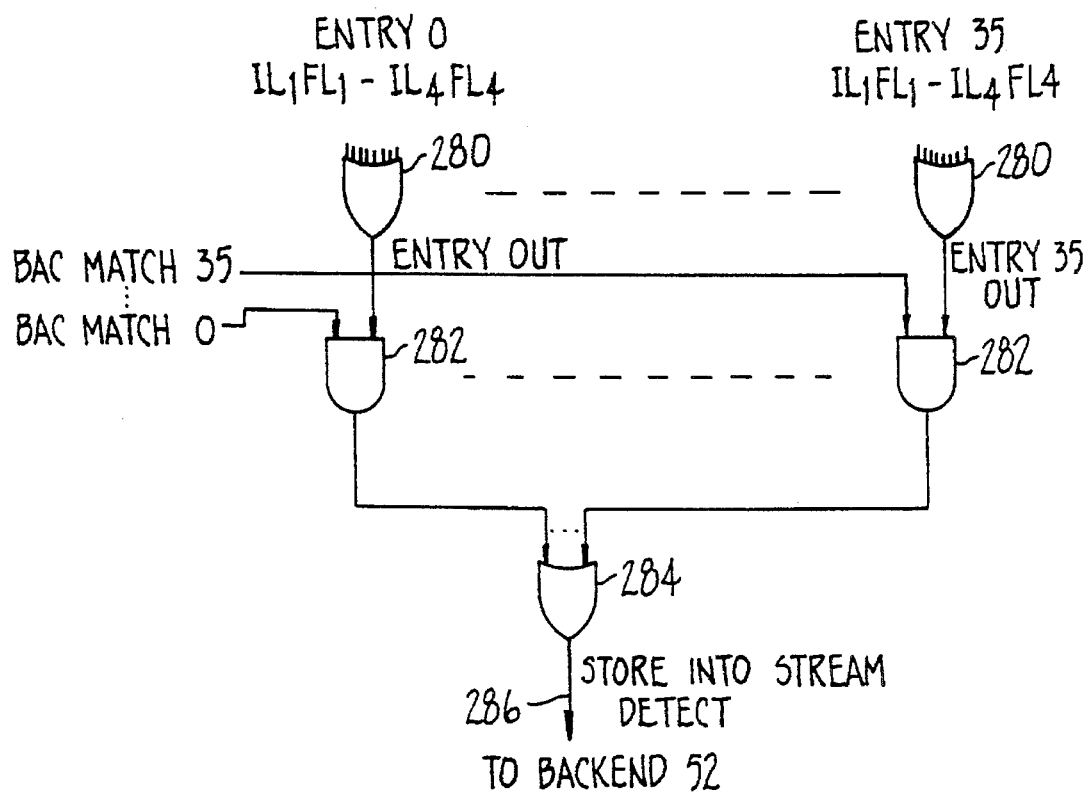
FIG._15.
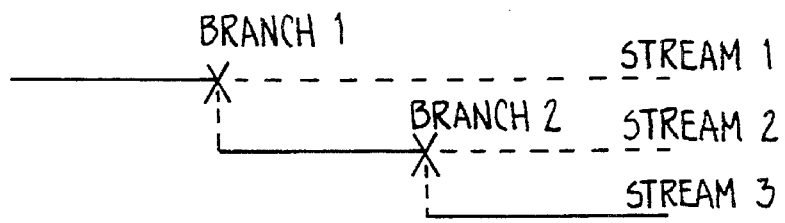
FIG._16.

METHOD AN APPARATUS FOR STORE-INTO-INSTRUCTION-STREAM DETECTION AND MAINTAINING BRANCH PREDICTION CACHE CONSISTENCY

This is a continuation of application Ser. No. 08/042,298, filed Apr. 2, 1993, now abandoned, and a cont. of 07/485,312, filed Feb. 26, 1990, and now U.S. Pat. No. 5,226,130.

Related applications filed on Feb. 26, 1990 concurrently herewith are entitled "Two-Level Branch Prediction Cache" Ser. No. 07/485,306, and now abandoned, "Integrated Single-Structure Branch Prediction Cache" Ser. No. 07/485,307, now U.S. Pat. No. 5,093,778, and "Integrated Instruction Queue and Branch Target Cache" Ser. No. 07/485,304, now U.S. Pat. No. 5,230,068.

BACKGROUND OF THE INVENTION

The present invention relates to branch prediction caches, and in particular to methods and apparatus for handling the modification of an instruction in the branch prediction cache or already provided to an instruction pipeline by an instruction farther along the pipeline.

As computer designers have designed increasingly higher performance implementations of various computer architectures, a number of classes of techniques have been developed to achieve these increases in performance. Broadly speaking, many of these techniques can be categorized as forms of pipelining, caching, and hardware parallelism. Some of these techniques are generally applicable to and effective in the implementation of most types of computer architectures, while others are most appropriate in the context of Speeding up the implementations of Complex Instruction Set Computers (CISC).

The purpose of creating a high-performance implementation of a CISC architecture system is to achieve the appearance of each instruction having a processing time of one or a few processor/clock cycles. However, such timing typically is only approximated. One of the principal reasons for not achieving a one-cycle processing time is the existence of various types of dependencies between neighboring instructions. The dependencies may result in the occurrence of processing delays.

One critical area in the achievement of a one-cycle processing time is in the handling of control dependencies, i.e. branch-type instructions. In the context of a CISC architecture implementation these instructions tend to be difficult insofar as being able to quickly calculate or otherwise determine the target address of a branch, to quickly resolve the proper path of subsequent instruction processing in the case of conditional branches, and in all cases to then quickly restart the fetching of instructions at the new address. Pipeline processing delays result when these operations cannot be performed quickly.

To minimize the actual impact of these delays on processing throughput, various types of prediction and caching techniques are available. The purpose of a designer in applying these various types of techniques is to always accurately predict the information to be produced by the above operations, i.e. branch target address, conditional branch direction, and the first one or more instructions at the branch target address. The percentage success rates of these prediction techniques then reduce the effective delay penalties incurred by the above three operations in corresponding amounts.

Generally speaking, existing techniques are based on the retention or caching of information from the prior processing of branch instructions. When a branch instruction is encountered again, and information from previous processing of this instruction is still to be found in the prediction cache structure, the cached information is then used to make an "intelligent" dynamic prediction for the current occurrence of the branch. When no such information is to be found in the prediction cache structure, either a "dumber" static prediction must be made, or normal processing, with the attendant possibility of incurring delays, must be performed.

Existing high-performance CISC designs use forms of cache structures to hold various combinations of information with the intention of predicting one or more of the three types of information mentioned above. In an aggressive all-encompassing design each entry holds: a record of the actual target address associated with the last occurrence of the branch; a copy of the first several instructions at this target address; and, in the case of conditional branches, a history record of the direction taken by each of the past couple of branch occurrences.

In parallel with the fetching and/or decoding of a branch instruction, the instruction is also looked up in the branch prediction cache. Generally, this look-up is based on the fetch address of the branch or on a closely related address. As the instruction is being decoded, the branch history information is used to predict the direction of conditional branches. The history information determines whether subsequent instruction processing should continue with the instructions sequentially following the branch, or with the sequence of instructions starting at the target address.

Whether the branch is conditional or unconditional, if processing is to continue with the target instruction stream, then the processing of successive instructions proceed without delay using the branch target instructions from the cache. At the same time, fetching of further non-cached instructions is immediately initiated using the predicted branch target address, plus an appropriate increment.

While this branch prediction design offers the possibility of fast, efficient processing of the predicted branches, the possibility of processing a branch instruction based on erroneous information is introduced. In general, handling mispredicted aspects of processing a branch must be an integral part of the overall central processing unit (CPU) design.

There are subtler issues stemming from the nature of the implemented architecture. In the case of many CISC architectures, one part of a program may modify other parts. These modified program parts are then executed. The result is that the modified image of these instructions, instead of the original image, is then executed.

For some CISC architectures which allow programs to modify itself, this type of programming practice has become an established practice within a significant portion of the existing software base. Consequently, to maintain backward software compatibility, new CPU implementations often must not only implement the direct semantics of the architecture's instruction set, but also maintain the appearances of this expected secondary semantic behavior. In the case of higher performance implementations this can become a significant, and potentially difficult, requirement to satisfy.

When cache-based dynamic branch prediction is incorporated into the design difficulties with high-performance arise. It is possible that the target address of a branch instruction, which might otherwise be a constant value for that instruction instance in memory, may be modified by what is normally an instruction that writes data to memory.

Or, for that matter, the branch instruction opcode may be changed to that of a different type of branch instruction or to that of a non-branch type of instruction.

Further, even if none of the bytes of a branch instruction itself are modified, one of the target instructions may be modified. To the extent that these instructions are fetched from main memory after any such modification has taken affect, there is no problem. But if, for example, a copy of the modified instruction is held in a branch prediction cache such as described above, and is fetched from there instead of main memory, then a consistency problem exists.

For both branch and target instruction modifications, the design of a branch prediction cache and associated control circuitry must maintain a sufficient degree of consistency to ensure proper processing of instructions. The maintenance of consistency must encompass not only conventional data/instruction cache consistency, but also consistency with respect to memory store instructions modifying other instructions which are executed shortly thereafter.

The consistency problem is essentially similar to that encountered with more conventional data/instruction cache structures used in high-performance CPU designs. Data writes by the CPU must be appropriately reflected in the state and/or contents of any affected cache entries. But the scope of the problem is more general than this. When other devices within the system, such as Direct Memory Address (DMA) devices or CPU's, modify main memory, the issue of cache/main memory consistency again arises. For a branch prediction cache these other devices are additional sources or causes of inconsistencies which must also be covered.

In extreme "store-into-instruction-stream" cases, such as a modifying instruction immediately followed by a branch and then a modified target instruction, this can be difficult. Particularly for highly pipelined, high-performance CPU designs, implementing this can prove to be expensive in terms of additional hardware circuitry, complex to design, and/or forcing compromise in the overall performance attainable by the design.

Pipelining, particularly the deep pipelining that is common in high-performance implementations of CISC architectures, results in large instruction processing latencies and high degrees of overlap between the processing of successive instructions. Access of a branch prediction cache and usage of the resultant prediction information and target instructions generally occurs early in such pipelines. Execution of memory writes by instructions storing to memory, on the other hand, generally takes place late in such pipelines.

Consequently, actions such as fetching target instructions from a branch prediction cache (BPC) can easily occur before architecturally preceding memory writes modifying such target instructions have actually been performed. Such actions may even occur before the store addresses have been generated, this being the earliest point at which potential consistency problems could be checked for and detected. The result is that consistency must be maintained with respect to not only the explicit contents of the branch prediction cache, but also with respect to the implicit contents associated with instructions currently being processed.

Insofar as these consistency issues apply to target instructions fetched from the cache, they also apply to instructions temporarily stored in and then taken from instruction pre-fetch queues. As a transient form of cache, a pre-fetch queue can lead to similar inconsistencies.

Overall, the need to maintain branch prediction cache and more general fetched instruction consistency, with respect to cases of "store-into-instruction-stream", as well as with respect to more generic modifications of main memory blocks, is a difficult problem.

SUMMARY OF THE INVENTION

The present invention provides for the updating of both the instructions in a branch prediction cache and instructions recently provided to an instruction pipeline from the cache when an instruction being executed attempts to change such instructions ("Store-Into-Instruction-Stream"). The branch prediction cache (BPC) includes a tag identifying the address of instructions causing a branch, a record of the target address which was branched to on the last occurrence of each branch instruction, and a copy of the first several instructions beginning at this target address. A separate instruction cache is provided for normal execution of instructions, and all of the instructions written into the branch prediction cache from the system bus must also be stored in the instruction cache. The instruction cache monitors the system bus for attempts to write to the address of an instruction contained in the instruction cache. Upon such a detection, that entry in the instruction cache is invalidated, and the corresponding entry in the branch prediction cache is invalidated. A subsequent attempt to use an instruction in the branch prediction cache which has been invalidated will detect that it is not valid, and will instead go to main memory to fetch the instruction, where it has been modified.

The present invention also provides for invalidating an instruction already provided to an instruction pipeline when that instruction is attempted to be changed by an instruction currently being executed. This is done by maintaining a copy of the target instruction address of the branch after the target instructions are provided to the instruction pipeline. These instructions (if still present) are then invalidated upon a detection of an attempt to write to them in main memory, and an error signal is generated. A control circuit for the instruction pipeline receives this error signal, and flushes the instruction pipeline of all instructions and results from the branch target instruction onward, and restarts the instruction pipeline at the branch target instruction. This stored group of instructions is referred to as a pre-fetch queue.

The branch target cache contains the basic hardware necessary for implementing the pre-fetch queue. One or more 24 byte portions of the branch target cache are simply designated as being used for the pre-fetch queue. These instructions can then be invalidated just like any other instruction in the branch target cache. For a fuller understanding of the nature and advantages of the invention, reference should be made to the ensuing detailed description taken in conjunction with the accompanying drawings.

BRIEF DESCRIPTION OF THE DRAWINGS

FIG. 3 is a block diagram of the front end block of FIG. 2, showing the branch prediction cache of the present invention;

FIG. 4 is a block diagram of the operation of the instruction cache of the present invention;

FIG. 5 is a diagram showing the contents of the branch prediction cache of the present invention;

FIG. 6 is a diagram of the consistency check comparisons done in the present invention;

FIG. 7 is a block diagram of the branch prediction cache according to the present invention;

FIG. 8 is a block diagram of the tag RAM of FIG. 7;

FIG. 9 is a diagram of the target address RAM of FIG. 7;

FIG. 10 is a block diagram of the branch target instruction sequence RAM of FIG. 7;

FIG. 11 is a block diagram of the target instruction valid and branch history memory of FIG. 7;

FIG. 13 is a diagram illustrating the pre-fetch queue in the branch target instruction sequence RAM of the present invention;

FIG. 14 is a flowchart of the operation of the control circuit for monitoring the pre-fetch queue for store-into instruction stream errors;

FIG. 15 is a diagram of the store-into-stream detection logic; and

FIG. 16 is a diagram of the multiple instruction streams resulting from multiple branches.

DESCRIPTION OF THE PREFERRED EMBODIMENT

Figure 1:
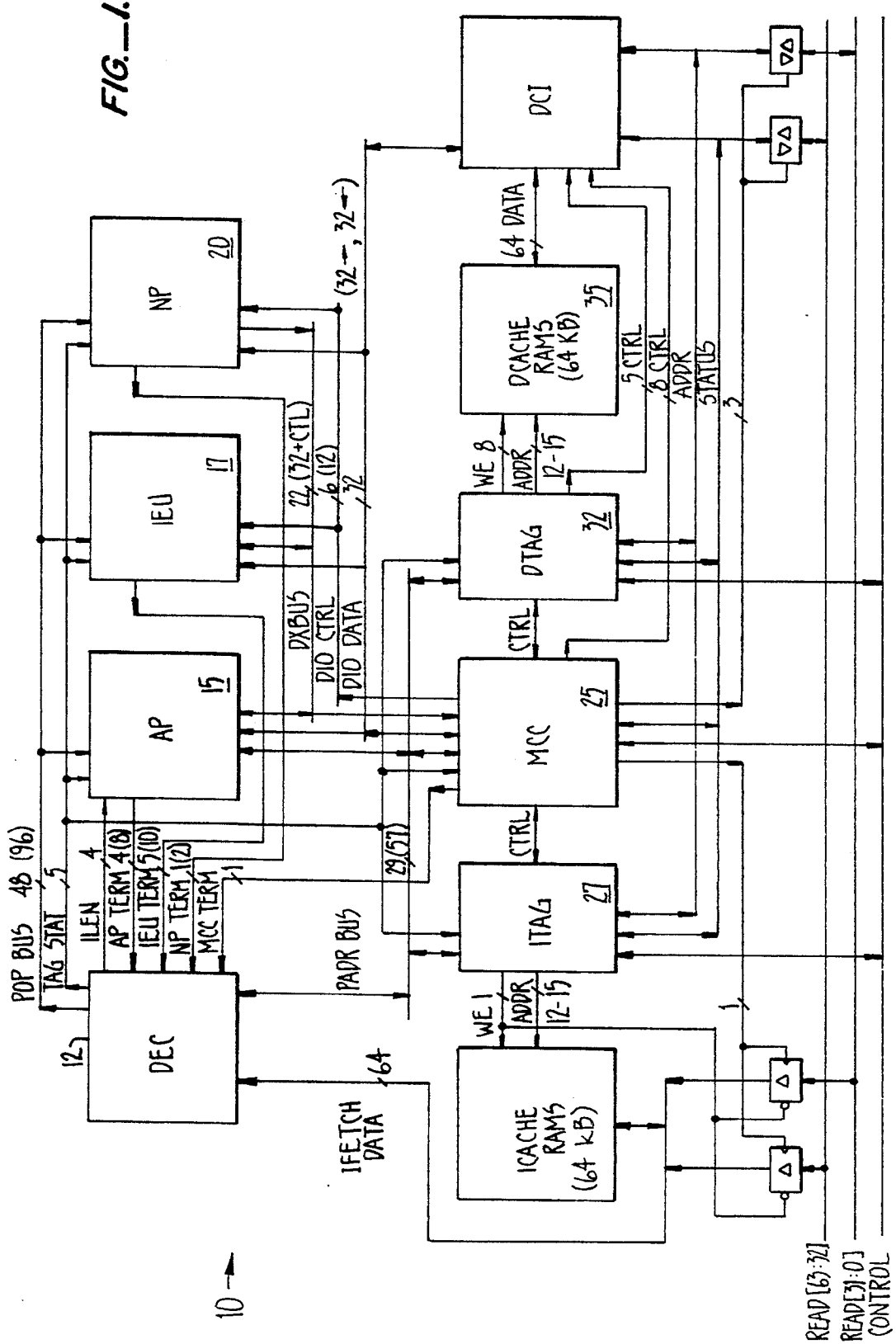
FIG. 1 is a block diagram of the computer system incorporating the present invention.

The following System Overview and Pipeline Control System Overview describe a pipeline system which can be flushed and restarted when a branch error is detected several cycles after the branch is taken. This is a necessary element of aspects of the invention set forth in Maintaining Branch Prediction Cache Consistency. System overview FIG. 1 is a block diagram of a CPU 10 incorporating the present invention. The CPU is designed to execute an instruction set compatible with that of the Intel 80386, as described in the Intel 80386 Programmer's Reference Manual published by Intel Corporation, Santa Clara, Calif., 1986. Each block in the diagram corresponds generally to a separate integrated circuit chip or group of chips in a current embodiment.

An Instruction Decoder (DEC) 12 performs instruction fetch, instruction decode, and pipeline control. DEC 12 optionally interleaves instruction pre-fetch of up to three simultaneous instruction streams. DEC 12 contains a fully associative Branch Prediction Cache (BPC) according to the present invention. The BPC is an integrated structure which contains dynamic branch history data, a physical branch target address, and a branch target buffer for each cache entry. As branch instructions are decoded, the BPC is consulted for information about that branch. Independent of the direction predicted, branches are executed in a single cycle and do not cause pipeline bubbles.

On each cycle, an instruction is selected from one of the three instruction buffers or a branch target buffer in the BPC. The instruction is decoded, assembled into an internal 96-bit decoded instruction word, referred to as a pseudo-op (p-op), and dispatched to the various functional units. Instruction decode generally proceeds at a single cycle rate. Each p-op issued by DEC 12 is given a tag which uniquely identifies each instruction currently outstanding in the machine. Tags are issued in increasing order, allowing easy determination of relative age of any two outstanding tags. Bus transactions between chips include the tag of the originating instruction. Functional units pair up instructions, addresses, and operands with these tags.

DEC 12 is also responsible for tracking the status of outstanding instructions, pipeline control, and for invoking exception processing when needed.

An address Preparation Unit (AP) 15 calculates effective addresses, performs segment relocation, and implements a demand paged memory management system. It contains a translation lookaside buffer (TLB).

An Integer Execution Unit (IEU) 17 performs single cycle execution of most integer instructions. It contains an 8×32 multiplier and accumulator array, as well as microcode for multiply and divide instructions. The pipeline control architecture allows the IEU to perform parallel and/or out-of-order execution of integer instructions.

A Numerics Processor (NP) 20 may optionally be included in the CPU. It is a high performance implementation of the IEEE floating point standard. The NP is integrated into the pipeline and does not incur any special overhead for the transfer of instructions and operands. Integer (IEU) and floating point (NP) instructions execute concurrently.

A Memory and Cache Controller (MCC) 25 is responsible for controlling the instruction and data caches and implements the cache coherency protocol. The MCC controls the interface to the System Bus, supporting high speed single and block mode transfers between cache and memory. The MCC also contains write reservation tables for integer, floating point, and system writes, and includes read after write short-circuit paths.

An Instruction Tag (ITAG) chip 27 contains the tag RAM for an Instruction Cache (ICache) 30. The tag RAM contains the address tag, a "Valid" bit, and an "Attention" bit for each line in the ICache. The Attention bit indicates that the DEC chip may also have data from this line cached in the BPC.

A Data Tag (DTAG) chip 32 contains the tag RAM for a Data Cache (DCache) 35. The tag RAM contains the address tag and line state bits for each line in the DCache. The possible line states are Absent, Shared Read, Owned Clean, and Owned Dirty, supporting a write back multiprocessor cache coherency protocol (modified write once). The tag RAM is dual ported to allow both CPU and bus snooping cache look-ups in a single cycle.

Each functional unit chip is packaged in a custom ceramic pin grid array (PGA) which contains power and ground planes and associated decoupling capacitors. Roughly 25% of the pins are dedicated to power and ground. For 0.8 micron to 1.2 micron processes, I/O delays are comparable to on-chip critical paths. Inter-chip I/O is incorporated into the pipeline, and thus does not add to the machine cycle time. ICache 30 and DCache 35 use conventional static RAM's.

Communications between the various functional units are carried out over a number of internal buses. These include: a 64-bit IFETCH DATA bus for instruction fetches; a 96-bit P-OP bus for communicating issued p-ops to the APU, the IEU, and the NP; a 52-bit PADR bus for communicating physical addresses; a 64-bit (32 bits in each direction) data cache bus DIOBUS for data cache transfers; a 32-bit bus DXBUS for inter-chip exchange; a 64-bit bus for cache/memory updates; and a number of termination buses (AP_TERM, IEU_TERM, NP_TERM, and MCC_TERM) from the functional units to DEC 12. Some of these buses are full width and some (e.g. P-OP bus) are half-width (time multiplexed). Interactions between functional units are generally limited to well defined transactions on the internal processor buses.

Pipeline Control System Overview

Pipeline control of the processor is distributed across the functional units mentioned above. No centralized scheduling or score boarding of the pipeline is performed. DEC 12 does observe certain overall resource constraints in the architecture and will occasionally hold off on issuing a decoded instruction which would violate resource limitations. Each functional unit is responsible for scheduling its own internal operations. Interlock checking is performed at a local level.

In a deeply pipelined machine, exception detection at various stages in the pipeline creates significant control difficulties. Each stage must be careful to hold off modification of state while any other stage may yet detect an exception on a previous instruction. Special purpose control logic is common, and careful pipeline simulations must be performed.

The processor deals with this complexity using a few techniques which are simple, general, and powerful. DEC 12 issues decoded instructions and the functional units process addresses and operands without regard for the consequences of exceptions detected by other functional units.

DEC 12 is responsible for determining when execution has proceeded beyond the point of an exception. Using techniques described below, the DEC will restore the state of the machine to the point immediately preceding (fault exceptions) or following (trap exceptions) the instruction causing the exception.

As noted above, each functional unit has a termination bus back to DEC 12. Signals on these buses indicate (by tag) when instructions have been completed and what exceptions (if any) were detected by that unit. The DEC uses this information to keep track of what instructions are outstanding in the machine, to track resource constraints, and to decide when exception processing must be initiated.

In response to abnormal terminations, DEC 12 will back up the state of the machine to the point of the exception, and begin issuing either a different instruction stream or a sequence of micro-instructions to invoke an exception handler. The processor uses one or more of five general mechanisms to permit the machine to be backed up to a particular state as part of DEC's response to abnormal terminations. These are issuing abort cycles, reassigning registers, using write reservation tables, using history stacks, and functional unit serialization.

Abort cycles are issued by DEC 12 when instructions which have been issued by the DEC must be flushed from the machine. During an abort cycle all functional units are provided a tag which identifies the boundary between instructions which should be allowed to complete and instructions which must be purged from the machine.

Register reassignment is used to restore the state of the general register files and the segment register file, flushing any modifications made for instructions which must be aborted. The functional units have more registers physically available than the instruction set specifies. DEC 12 maintains a set of pointers which map the programmer visible (or virtual) registers onto the physical registers. In assembling decoded instructions, the DEC will substitute the appropriate physical register numbers into the register specification fields.

When a virtual register is to be modified, the DEC will first allocate a new physical register, modify the pointer set, and use the allocated register number as a destination register. Following execution of the instruction, the old physical register still contains the original value of the virtual register, while the new physical register contains the modified value of the virtual register. To back out of the register modification, the DEC must restore the pointer set to its value prior to issue of the instruction.

As physical registers are freed up, they are placed at the end of a free list which is sufficiently long to guarantee that a physical register will not appear at the head of the free list until after its contents are no longer required. The DEC maintains a history stack of pointer values, as is described below.

Write reservation tables are used in MCC 25 to queue up data writes until it is known that the writes will not have to be aborted. The MCC receives addresses and operands on the internal data buses, matches them up by tag, and waits for permission from the DEC to perform the irreversible write.

History stacks are used for saving and restoring miscellaneous machine state, such as the register reassignment pointers, flags register, and program counter.

For machine state which is rarely modified, the cost of a history stack of values is not justified. For these cases, the functional unit which is to perform the modification (and only that unit) halts processing, and the tag of the oldest outstanding instruction in the machine (as provided by the DEC) is examined on each cycle to determine when all older instructions in the machine have been successfully completed. At this point there is no longer any need to preserve the old value of the machine state and the functional unit makes an irreversible change to the machine state.

The distributed pipeline control scheme, combined with the ability to back out of any state modification, allows a number of performance optimizations.

Each functional unit receives only operations which actually require processing in that unit. This is in contrast to conventional pipelines in which instructions flow through all stages in the pipeline, whether the stage has useful work to do or not.

Furthermore, each unit performs an operation as soon as all input operands are available. When complete, the result is passed to the next stage for further processing, and the next operation in examined. A stage only stops execution when it has nothing available for execution.

This behavior allows out-of-order execution between functional units. For a memory write which has an address generate interlock, for example, the AP will not be able to compute the memory address. The IEU, however, is able to provide the data and does so immediately, after which it continues on to the next instruction. The AP's interlock does not need to create a pipeline bubble in any other pipeline stage. Later on, the IEU may be held up performing a multiply, or waiting for a memory operand. At this time, the AP has a chance to catch-up with the IEU.

From the viewpoint of a particular functional unit, this isn't a complicated concept. The functional unit makes a local decision, completely unaware that it might cause instructions to be completed out-of-order. The pipeline control mechanisms guarantee that any modifications made by an instruction executed out-of-order can be purged. The functional unit makes no special checks.

Out-of-order execution between functional units happens for free as a result of the distributed decision making within the processor. Even within a functional unit, instructions could be safely executed out of order. IEU it provides an example of internal out of order execution. The IEU examines the instruction at the head of it's instruction queue to see if it is ready to execute. If a data interlock prevents immediate execution, the IEU will examine the next younger instruction to see if it is ready to execute. This process can continue until an instruction is found which can execute. The IEU will only pay a data interlock penalty if there is no instruction available which is ready to execute.

Note that even if the IEU pays an interlock penalty, that doesn't mean that the processor as a whole loses a cycle. The IEU may have been running ahead of other functional units at the time. Even if the IEU falls behind, it may be able to catch-up later when an instruction is issued which does not require the IEU. Finally, the penalty cycle may be overlapped with a penalty cycle from AP 15, allowing two penalties to count as only a single lost cycle.

A special case of a functional unit choosing to execute instructions out-of-order is parallel execution of instructions within the functional unit. In particular, this concept is applied to instructions which take multiple cycles. Parallel execution of other single cycle instructions allows the multi-cycle instruction to have an effective throughput of one cycle.

DCache misses would normally stop the pipeline for a full cache miss penalty. To the extent that the functional units can continue to find operations that can be executed without the cache data, the cache miss penalty is reduced. The same is true for misses in the AP chip's TLB. These cases are different from the others in that the number of penalty cycles is usually fairly high, making it difficult to fully overlap them with useful work.

Pseudo-Op Tracking and Issue Control

Figure 2:
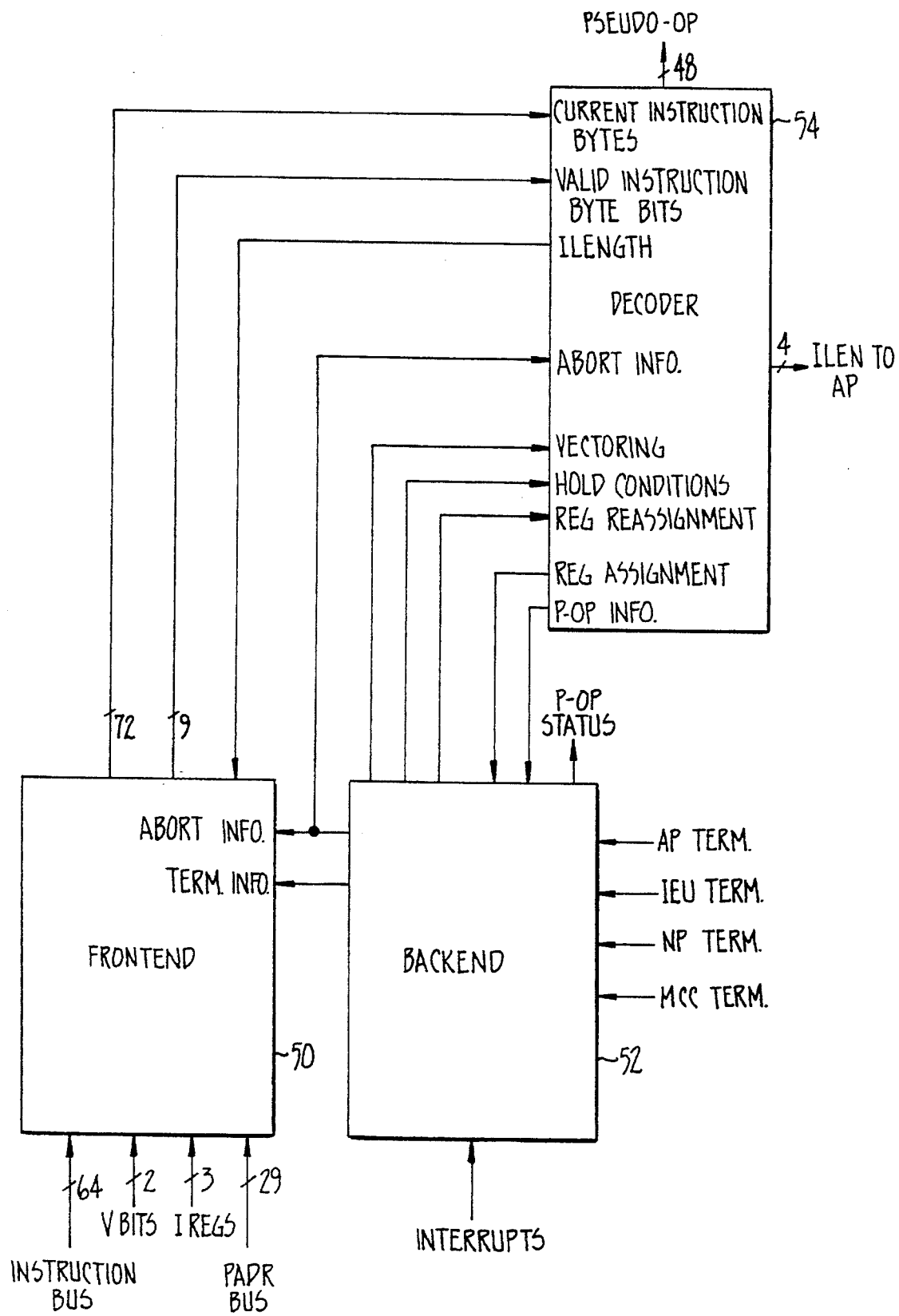
FIG. 2 is a block diagram of the decoder block of FIG. 1.

FIG. 2 shows the front end 50, back end 52 and decoder 54 of DEC 12 of FIG. 1.

As each pseudo-op (p-op) is issued by DEC over the Pseudo-Op Bus, it is queued by the appropriate functional units (AP, IEU, NP). Each functional unit then processes its p-op stream in a loosely coupled manner with respect to other units, and signals a termination to DEC as each p-op is completed. It is DEC's responsibility to keep track of all outstanding p-ops as they float around through the CPU; to appropriately control the issue of p-ops so as to ensure reliable operation (in the context of the CPU's tagging scheme to control p-op, address, and data processing); and to arbitrate over abnormal conditions signaled by functional unit terminations, and then initiate appropriate actions.

Inside DEC this is controlled by two loosely coupled blocks called the decoder and the back end. The former is responsible for decoding macro-instructions and issuing all p-op sequences, while the back end then handles the tasks summarized above. Another block inside DEC, the front end, is responsible for fetching and supplying instruction bytes to the decoder. As the decoder issues a p-op it also passes along information about the p-op to the back end. This is used to identify the correct actions necessary to perform the above tasks. FIG. 3 shows the DEC front end.

The back end, based on all the outstanding p-ops, will control the issue of following p-ops by the decoder so as to continuously satisfy a variety of constraints which are required for correct, reliable CPU operation. As terminations are received from each of the functional units, the back end maintains the status of each outstanding p-op. Some terminations are "accumulated" until some future point in time. During "normal" operation this tracking primarily influences the issue of following p-ops. But, to the extent that abnormalities are signaled by the functional units via corresponding terminations, the back end resolves multiple abnormal terminations of any given p-op, and then initiates the appropriate response. This can include sending an abort cycle out to all the other functional units (including also MCC) so as to back up the state of the CPU to some prior state of p-op processing.

For the most part, the functional units are not concerned with the status of outstanding p-ops, except when an abort occurs. The primary exception to this is MCC which needs to know when it is safe to actually perform memory and I/O writes into the cache and/or out to the rest of the system. In special cases AP and IEU also need to know when it is safe to execute certain p-ops. All these needs are satisfied by the back end through the continual issue every clock cycle of information over the Tag Status Bus which reflects the current outstanding p-ops and signals aborts.

Maintaining Branch Prediction Cache Consistency

FIG. 3 shows front end 50 in more detail, containing branch prediction cache 54 and control logic and state machine 56. Control circuit 56 generates the necessary control signals for the operation of branch prediction cache 54.

FIG. 4 illustrates the operation of the instruction cache 30 of FIG. 1. The instruction cache memory array contains a number of lines, or entries, 60, 62, 64, etc. Each line contains a block of 32 bytes of a local copy of main memory data. Those 32 bytes may contain several instructions. Each instruction can be of arbitrary length (1 byte, 2 bytes, 3 bytes, etc.), and may not be entirely contained in the 32 byte block. The instruction cache is always loaded in contiguous 32 byte blocks. This reduces the number of address bits connected to the cache, and also tends to load the next sequential instructions which are likely to be used. In addition, the overhead required to reference main memory is amortized over the entire 32 byte block.

The instruction cache is direct-mapped, with each block of instructions having a designated line in the instruction cache where it belongs. This designated line is determined by the index bits 66 as illustrated in FIG. 4. These index bits are a portion of the bits of the instruction block addresses and are called the cache line address. A number of blocks from main memory will have the same index bits, and thus share the same line of the instruction cache. Accordingly, only a single block from each group of blocks having the same index can be in the instruction cache at any one time. The appropriate location in instruction cache memory array 68 for an instruction block is determined by decoding the index bits 66 with a decoder 70 and selecting the appropriate line with one of select lines 72.

A record of which 32 byte block of instructions is stored in a particular line in the instruction cache is kept in a corresponding instruction tag RAM 27 shown in FIG. 1. The address of the block which is actually stored in the corresponding line is stored in instruction tag RAM 27, and can later be compared to the address of the instruction block for an instruction to be fetched to determine if that instruction is indeed in the corresponding line in instruction cache 30.

Branch prediction cache 54 of FIG. 3 is illustrated in FIG. 5. To understand FIG. 5, it is best to review what a branch instruction is. The instruction causing the change in control flow is called the "branch instruction", and the address of this instruction is called the branch instruction address. The branch instruction may include within it the address of the instruction to be branched to, which is called the branch target instruction. The address of the branch target instruction is the "target address". Alternately, a formula for calculating the target address may be included in the branch instruction. In addition, the branch instruction may be a conditional branch. A conditional branch causes a jump to a branch target instruction only if a test set forth in the branch instruction is met. If the condition is not met, then the branch is not taken and sequential execution continues.

Returning to FIG. 5, the branch prediction cache contains a number of columns. A first column 74 contains a tag which identifies the cache contents for a particular line. That tag is the branch instruction address itself. A separate column 76 contains a valid bit for each entry, indicating if the entry is valid. Another column 78 contains the target address pointed to by the branch instruction whose address is given in column 74. At least the first byte of the actual branch target instruction itself (possibly the entire instruction), possibly along with sequentially occurring instructions after the branch target instruction, up to 24 bytes total, is set forth in a column 80. Thus, the first useful instruction in the 24 bytes is located at the address pointed to by the target address of column 78. A column 82 contains valid bits for each of the instruction word blocks in column 80. Finally, a branch history column 84 contains two bits indicating the direction of the branch during the past executions of that branch instruction. For example, the possible arrangement of the two bits in column 4 could be as follows where the two choices of the conditional branch are A and B:

| Bit Pattern | Branch History |
|---|---|
| 00 | AA |
| 01 | AB |
| 10 | BA |
| 11 | BB |

The present invention provides a set of mechanisms for maintaining instruction consistency, both for instructions resident in a branch prediction cache and for instructions being processed within a CPU pipeline, when a Store-Into-Instruction-Stream occurs. The mechanisms involve minimal constraint or impact on pipeline performance. This invention is able to handle all inconsistency cases of interest.

The overall problem of maintaining consistency can be broken down into two areas of concern of increasing difficulty. (1) The simplest area involves maintaining consistency between branch prediction cache (BPC) target instructions and corresponding main memory images. This maintenance is significant given the presence of conventional instruction and data caches within the CPU, as well as within other CPU's of a multiprocessor system. (2) The second, more difficult area involves handling the relatively extreme case in which the instruction being modified has been fetched before the store address for the modification has been generated by the CPU pipeline.

BPC and Main Memory Consistency

Many multi-processor systems utilize some form of hardware cache consistency protocol based on monitoring of common or global memory bus traffic by each cache. While conceptually the BPC could be added as another direct participant in such a scheme, in practice there are disadvantages to this strategy, such as BPC address look-up bandwidth limitations, or physical design partitioning and packaging considerations. This invention extends the instruction cache consistency protocol to also indirectly include the BPC.

There are two consistency checks:

1. Writes originating from the local CPU on the bus in the middle of FIG. 1—"internal writes".

2. Writes originating from some other CPU or other bus master on the bus at the bottom of FIG. 1— "external writes".

Internal writes are performed without ITAG assistance and match the entire 32 bit address (truncating the 5 LSB's). External writes require ITAG to reflect the line address (as described below with reference to FIGS. 6 and 9) to the BPC; only a line address match is required. Line replacement is treated like an external write.

In essence, the BPC is maintained, insofar as its caching of target instructions, as a strict subset of the instruction cache for external writes. Instructions are loaded into a BPC entry only when they are also resident in the instruction cache; whenever copies of instructions are removed from the instruction cache, any associated copies in the BPC are also removed.

In one embodiment, the latter condition is maintained by the use of "Attention" bits, one per instruction cache line. The Attention bit of a cache line is set when a copy of one or more instruction words resident within that line are entered into a BPC entry. Then, when such a cache line is invalidated or otherwise modified, the set Attention bit signals the need to do a BPC consistency check. While any associated instruction copies may have already been replaced from the BPC, any copies still resident are detected and immediately invalidated.

In a second embodiment, the Attention bits are not used. All instruction cache invalidations, replacements, and other relevant modifications, result in a BPC consistency check. The Attention bits reduce the amount of consistency check traffic between the instruction cache and the BPC at the cost of additional hardware.

The BPC of the invention contains a number of entries, each associated with a previously encountered branch. Within each entry is a predicted target address, conditional branch direction history, and a portion of one, or more of the first several target instructions. The target address also identifies the first target instruction byte cached within the entry.

To perform a BPC consistency check, the cache line address is compared with all the target addresses within the BPC. This consistency check is a fully associative access. The target instructions associated with any target addresses matching the address presented to the BPC are then invalidated.

This check is complicated by the mismatch between the aligned 32 byte line address being presented to the BPC, and the somewhat arbitrary alignment of up to 24 bytes of target instruction data cached within each BPC entry. While the 24 bytes are constrained to be a block of one, two or three contiguous aligned 8 byte blocks of instruction memory image, this block can span up to two cache lines.

Consequently, to resolve this problem, a modified form of the stored target address within each entry is used for comparison purposes. First, the target address is "truncated" on the least significant end to aligned 32 byte resolution. In the case where the associated cached target instruction data spans only one aligned 32 byte block, this is sufficient. Second, to handle the more general case of target instruction data spanning into the next sequential 32 byte block, the target address is incremented by 32 bytes (the length of the entry) to give the cache line address spanning the end of the entry. A truncated portion of this address is stored and identifies the next 32 byte block.

These two addresses identify the first and last aligned 32 byte blocks of address space spanned by the cached target instruction data of an entry. When only one block is spanned, these two addresses will happen to be identical. During a consistency check, a match with either or both of these addresses results in invalidation of the cached target instruction data of that entry.

A further modification is made in this invention. When two blocks are spanned by target instruction information of a BPC entry, they are constrained to be in the same page of address space, i.e. the same 4K byte block. When they are not, only the target instruction data in the first block are actually cached.

The same page space constraint guarantees that the higher-order address bits (higher than the page boundary bit) of the two target addresses within an entry are identical. Consequently, only one set of high-order address bits need be stored. The comparisons within each BPC entry for a consistency check now become the following: if the high-order address bits match and either of the low order sets of address bits match, then an invalidation is performed.

This is illustrated in FIG. 6. The target address 90 has 20 higher order bits and 12 low order bits. The 5 lowest order bits are truncated, since these bits simply set forth the location within a particular 32 byte aligned block. By incrementing the target address by 32 bytes, the address covering the end of the 24 byte section is provided. To determine which 32 byte line block this address falls within, the last 5 bits are again truncated. Since the system requires that any 24 byte section which spans two 32 byte blocks must be within the same page, the bits above the page boundary bit can be ignored. This leaves a middle 7 bits which are then written into a separate memory location 92. For both 32 byte lines, it should be remembered that the instruction cache is indexed by 4 bits, with instruction blocks which have the same index bits sharing the same instruction cache line.

Since, for external writes, target instruction data is only stored in the BPC if it is also in the instruction cache, the higher order bits of the target address which has index bits corresponding to the index bits of an instruction cache line being invalidated will necessarily be identical with the address of the instruction block actually within that line in the instruction cache. Accordingly, only the four index bits need to be compared in order to determine which target addresses correspond with that line of the instruction cache.

Thus, for the consistency check comparison, those four index bits are combined with the two 7 bit version stored in memory elements 90 and 92. These are then compared and comparators 94 and 96, respectively, with the corresponding 11 bits of instruction address for the instruction line being invalidated. Actually, the implementation separately compares the four bits as shown in more detail in FIG. 9, as described below.

Instruction Cache Miss

One potentially complicating issue arises in connection with the cache replacement typically associated with an instruction cache miss. While the miss address is usually conveniently available, the address of the instruction block being replaced out of the cache may not be. It is this latter address which needs to be presented to the BPC for a consistency check.

This problem is also dealt with using the index bits and treating the operation like an external write. By not including the bits more significant than the index bits in the consistency check comparisons, the miss address can be presented to the BPC in place of the replaced address. Since any address having the identical index bits must be in the same line of the instruction cache, and since anything in the BPC must also be in the instruction cache, the instruction address being overwritten is the only one which could be present in the BPC. Accordingly, use of the index bits of the miss address is guaranteed to catch only the correct address in the BPC.

Details of BPC

FIGS. 7–12 show the BPC in more detail. FIG. 7 is a block diagram showing the various elements in BPC 152. The BPC comprises entries containing a relatively large amount of prediction information. In the preferred embodiment, this cache structure contains a full scope of information to enable single branch execution, including: the branch direction if the branch is conditional, the branch target address and cached target instruction data. More specifically, each cache line contains the target address from when the branch instruction was last executed; up to the first 24 bytes of sequential instruction stream starting at the target address; and two history bits recording the direction taken during past executions of the branch instruction.

To this end, BPC 152 includes the branch address tag memory, called a program counter content addressable memory (PcCAM) 170 with associated valid bit (Vbit) memory 172. The target address memory is a branch address cache/target CAM (BAC/TgtCAM) 175. The history of past branch directions is in a branch history cache (BHC) 177. A branch target cache (BTC) 180 contains the target instruction data, with an associated target instruction valid (TIV) memory 182 storing valid bits for the instruction data in BTC 180. Each of the memory arrays contains 36 lines and is directly accessed via word select inputs (as opposed to encoded word address inputs). Some of these sets of word selects for reading and writing each line are generated by address selection logic 185 with associated multiplexer 188. Other word selects are generated by the match outputs of PcCAM 170. A Least Recently Used (LRU) logic block 181 has logic which performs the function of selecting a BPC line to be overwritten by a new block of instruction data.

Given the relatively limited size of this cache, it is designed to support accesses in a highly associative manner versus a direct-mapped or two/four-way set associative manner. This look-up, to check whether an entry currently exists in the cache for a branch about to be processed, is typically performed using the address of the branch instruction. For some pipeline designs, a closely related address may instead need to be used.

In this context, the term fully associative means that bits of the input address are compared with potentially matching bits of all the entries in cache. A hit is defined to have occurred when the input address matches at least one stored address. The term direct mapped means that some number of bits of the input address are used to index into the memory, and the remaining bits are stored in the memory. When the entry is read out of the memory, the stored address bits are compared with the corresponding bits in the input address, and a hit is defined to have occurred when the two agree. This entails a single comparison. In the event that two branch instructions index to the same entry (different PC's with the same set of index bits), a direct mapped cache can only accommodate one, even if there are other empty entries. The term two-way set associative refers to a structure with two memory banks, so that two entries are read out for a given index and two comparisons are performed. This concept can be expanded to more than two-way set associative.

In the preferred embodiment the address of the first byte of the next instruction to be decoded is used for the look-up in the BPC, and is done in parallel with instruction fetch completion and start of instruction decode. This look-up is also done in a fully associative manner which provides substantial performance improvement relative to direct-mapped or two/four-way set-associative access methods.

A cache tag for each entry, namely the instruction address of the branch associated with the entry, is stored in PcCAM 170. A cache look-up is performed by accessing PcCAM 170 using the above next instruction address, and then reading out the prediction information from any, but at most one, entry for which there was a tag match.

This greater associativity is with respect to both cache look-ups and cache replacements, i.e. when adding each entry to the cache a new entry to the cache requires that some other (hopefully less beneficial) entry be removed to make room. Through the greater flexibility in choosing "old" entries to be replaced by new entries, it is statistically possible to better approximate the ideal of retaining prediction information for the branches deemed most likely to be processed again in the near future and the most often. In essence, full associativity maximizes the prediction cache's hit rate for a given cache size (in number of entries).

An instruction buffer 153 (shown in FIG. 3) is used for temporarily holding instruction bytes before they are aligned and provided to the instruction register.

The circuitry will now be described with additional reference to a series of logic schematics. Each logic schematic for one of the memories shows the circuitry for one line in that memory. Since there are 36 lines, in BPC 152, the circuitry shown for a given memory is repeated 36 times for that memory.

FIG. 8 is a logic schematic of PcCAM 170 and associated Vbit memory 172. PcCAM 170 is a RAM/CAM array holding the instruction address of the branch for which each cache entry is storing prediction information. Each line in PcCAM 170 includes a 32-bit RAM word 190 and a CAM comparator 192. Each line in Vbit memory 172 holds a valid bit indicating the overall validity of the line, and is implemented as a latch 195. The CAM address input may be the address of the first byte of the next instruction to be decoded, and is compared with the contents of RAM word 190. In the event of equality, the CamMatch2 line for that entry is asserted, as qualified by a true output from Vbit latch 195.

The nature of PcCAM 170 supports fully associative BPC lookups and replacements. The CamMatch2 signal from each line is output for use by the other BPC components, while the RAM aspect of the array applies only to writing instruction addresses into the PcCAM.

FIG. 9 is a logic schematic of BAC/TgtCAM 175. The BAC/TgtCAM is a mixed RAM/CAM array holding the target address from the most recent execution. Each line includes a 39-bit RAM word 200, a 16-bit CAM, a comparator 207, a 4-bit CAM comparator 202, a pair of 7-bit CAM comparators 203 and 205, and associated logic. Of the 39 bits, 32 bits are the target address of the branch, the other 7 bits are additional target address information, as will be described below. The full 32-bit target address is made available for readout if the particular BAC/TgtCAM line is selected, as determined by CamMatch2 from PcCAM 170 via mux 188.

The CAM segments of BAC/TgtCAM are used to detect memory stores by instructions currently being processed within the CPU pipeline or external writes or replacements. Since these instructions possibly modify target instruction bytes, it is necessary to invalidate the BPC entry in order to maintain proper coherency between target instruction bytes in the BTC and their image in main memory (actually in the ICache).

ICache RAM chip 30 contains 64 kilobytes, organized as 32-byte lines, and is thus characterized by an 11-bit address (the five low order bits may be ignored). The ITAG RAM contains the high order 16 bits. The 27-bit address ChkAddr of a line being written in the ICache is communicated to the CamAddr1 input of the BAC/TgtCAM. However, the BTC entry could straddle a line boundary, and so may be characterized by two line addresses. Thus, two target addresses (which may be the same) need to be stored and checked. In fact, the high order 16 bits need not be checked for an external write, because the BPC is constrained to have only entries which are in the ICache for external writes. All variations of the upper 16 bits of instruction addresses which have the same 11 bits below must share the same ICache line so only 11 bits of each address need to be checked, as described earlier in connection with FIG. 6. Two 11 bit addresses in the BPC are checked, covering the possibly two lines which could be spanned by a 24 byte BTC entry. By requiring that the two lines be in the same 4-kilobyte page (i.e., that the BTC entry not straddle a page boundary), the 4 most significant bits of the second 11 bit address will be the same as for the first 11 bit address, and can be ignored. To save space, the 7 bits of the second address are added to the same physical RAM word containing the 32 bit BAC address. CAM comparators 203 and 205 compare the two 7-bit fields of the RAM line with the corresponding 7 bits of ChkAddr on the CAMAddr1 input while CAM comparator 202 compares the 4-bit field in the RAM line with the corresponding 4 bits of ChkAddr.

A match is defined to have occurred on a particular line if the 4 bits of the 27-bit ChkAddr match the 4 bits of the RAM line (as detected by comparator 202), the 7 bits of the ChkAddr match either 7-bit field of the RAM line (as detected by comparators 203 and 205) and the external write line is enabled or (for internal writes) the 16 bit field of ChkAddr matches the 16 bit field of the RAM line (as detected by comparator 207). If a match occurs (more than one can occur since more than one BTC entry can be affected by a write in a given line), the corresponding BPC entries are invalidated.

The 32 bit branch target address can be read out through driver 204 on data bus rdBACData.

FIG. 10 is a logic schematic of BTC 180. Each BTC slice comprises a 192-bit RAM word, implemented as three 64-bit RAM words (8 bytes) 220a, 220b, and 220c. Depending on the instruction length and alignment, the BTC possibly holds the first few instructions at the target address of the branch (in this case, up to the first 24 bytes of aligned target instruction data). In the context of the preferred embodiment, in which a CISC architecture possessing variable byte length instructions is implemented, the BTC cache caches the target instruction stream image as found in main memory. As an alternative, the first one or several target instructions could be cached in an alternate, possibly decoded, representation that may be more suitable for other CPU implementations.

Each 64 bit output is provided through drivers 218a, 218b and 218c, with each RAM word output forming a 64 bit portion of 192 bit rdData output bus. The read select signal for a particular one of the 36 lines is provided through an AND gate 216. The write select signals are provided through a series of AND gates 214, 212 and 210.

FIG. 11 is a logic schematic of TIV 182 and BHC 177. Each line of TIV 182 includes latches 225a, 225b, and 225c, each holding a valid bit corresponding to eight of the 24 instruction bytes within the BTC line. Each line of BHC 177 is a 2 bit RAM 127.

Figure 12:
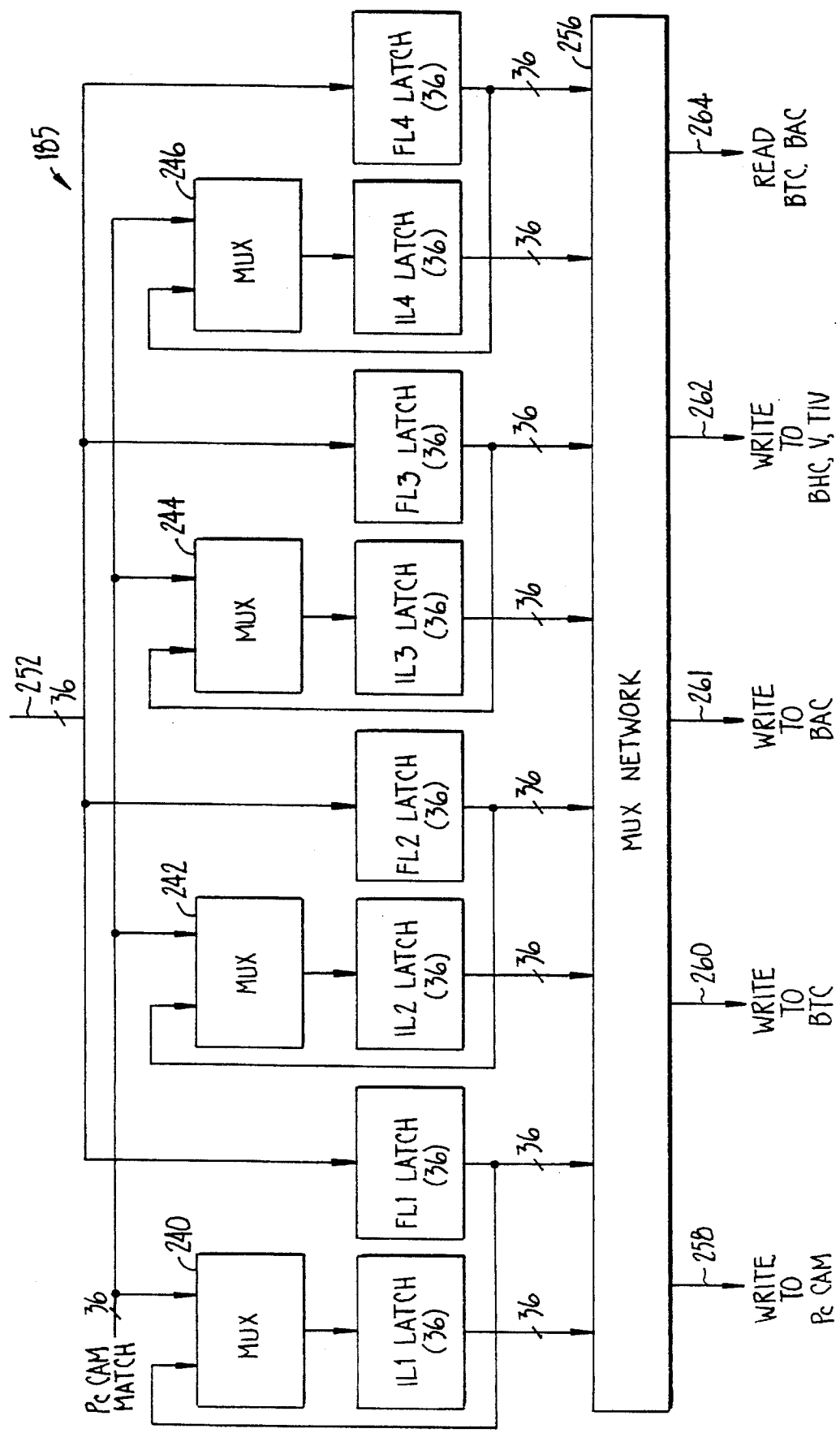
FIG. 12 is a diagram of the address selection logic of FIG. 7.

FIG. 12 is a logic schematic of address select circuitry 185. Four pairs of latches designated IL1, FL1 through IL4, FL4 are provided. The first latch (IL) in each pair stores a pointer to an entry in the branch prediction cache. Four sets are provided to track multiple branches. The second latch (FL) in each pair is provided to point to a pre-fetch instruction queue which may be associated with each branch.

One input to each of the IL latches is provided through multiplexers 240, 242, 244 and 246 from the PcCAM match line 248. Inputs to the FL latches are provided through a 36 bit input bus 252. The outputs of both the IL and the FL latches are provided to a multiplexing network 256.

The circuit of FIG. 12 provides a flexible approach to producing a number of control signal outputs from the multiplexing network 256, as discussed below. For example, a PcCAM match will provide a 1 bit on one of the 36 bit lines, with all the rest being zero. This could be written into IL latch 1, for instance, so that a single bit in latch IL1 is enabled. The output could then be provided to multiplexing network 256 to activate the appropriate control lines for that entry.

Integrated BPC Data Paths

In the context of a highly pipelined architecture, it is desirable to be able to perform several operations on the BPC at one time. For example, typical operations would be accessing the BPC on every cycle. It might be desired to store target bytes in the BTC, to invalidate an entry, or to update the history bits. As will be described in detail below, address select logic 185, PcCAM 170, and BAC/TgtCAM 175 provide various select and enable signals to control reading, writing, setting and clearing of addresses, instructions, and valid bits. The integrated BPC structure allows any number of these operations to be performed in the same cycle for different entries without contention of competing elements.

1. Read an Entire BPC Entry on a PcCAM Match

A first access path, used to access the BPC entry, is invoked by communicating a 32-bit DecodePC signal to the CamAddr2 input of PcCAM 170. If a match occurs, a single bit of the 36-bit CamMatch2 output 248 is asserted, and is communicated to read select inputs on the other memory elements, namely BAC 175, BHC 177, BTC 180, and TIV 182 via mux 188. The result is that the corresponding entries, constituting the entire BPC entry, are read out of respective data outputs of the memory elements.

2. Write to PcCAM

A second access path, used to clear an old entry and start a new entry, is invoked by writing a 36 bit word, with all 0's except for a single bit, which has a 1, into one of the latches of FIG. 12 through input 248 and multiplexers 240, 242, 244, and 246. The desired 32-bit address to be stored is provided to the WrData input of PcCAM 170 (see FIG. 7). The output 258 of multiplexer network 256 is selected to assert signals at the WrSel2 input of PcCAM 170, and the Clearza input of Vbit memory 172. This enables writing a new entry into the PcCAM, and clears the valid bit, pending acquisition of the target bytes. The same latch is used as a pointer for the BTC write, BAC write and BHC, V and TIV writes for that entry.

One latch pair in address select logic 185 is a working latch pair which is not being used to track a particular branch at that time. The use of four sets of latches allows three instruction streams to be kept active (the original stream and two branches), while the fourth pair of latches is used for working purposes such as writing to PcCAM. The output of each FL latch, which is written to through address input 252, is also coupled back through the multiplexers 240–246 so that it can be written into the IL latch as desired.

In practice, the FL is loaded for access (2), a write to PcCAM. It remains unchanged throughout (3)–(6) style accesses below if there is a hit. If there is a miss and an entry is created, then the FL is reloaded to point to a new queue. Accesses (3)–(6) may then occur.

Similarly, IL is loaded when there is a hit with the PcCAM output. It is then used for accesses (3)–(6).

3. Write to BTC

A third access path is used to fill in the BTC. The line is pointed to by the latch pointing to the PcCAM portion of the line. Three 8-byte select signals are provided to the WrEnx2 input of BTC 180. A single 8 byte block to be stored for the selected entry is provided to the WrData inputs on BTC 180. This allows part of a BTC entry to be written as multiplexer network 256 output 260 asserts select signals at inputs to the WrSel2 input of BTC 180.

4. Write to BAC

A fourth access path is used to write 39 bits of target address to the WrData inputs of BAC/TgtCAM 175 when the target address is available.

5. Write to BHC, V and TIV

For a fifth access path, a valid data bit is provided to the WrData input of Vbit memory 172, 3 bits are provided to TIV 182 and 2 bits of history information are provided to the WrData inputs of BHC 177. This allows completion of the BPC entry as output 262 of multiplexer network 256 is selected.

6. Read BTC and BAC

A sixth data path is invoked by referencing one of the IL or FL latches as output 264 of multiplexing network 256. A select signal is also provided to multiplexer 188. This allows a given BTC and BAC line to be read out independently of any CAM hit from PcCAM 170. The entire BTC entry can be read, or one or more of the three double-words in the BTC entry can be read. This provides flexibility that allows certain otherwise unused BTC entries to be used for other purposes (such as instruction queues) and be controlled independently.

7. Consistency Check of BAC

A seventh access path is invoked by communicating ICache address information to the CAMAddr input of BAC/TgtCAM 175 for an external write to the ICache. As mentioned above, the CAM portion of BAC/TgtCAM 175 performs the function of maintaining consistency between the target instruction bytes in BTC 180 and corresponding bytes in main memory (actually in the instruction cache). A match causes assertion of the appropriate CamMarch1 output line 266, and clears the corresponding Vbit entry.

8. Invalidate All 36 BPC Entries

An eighth access path is invoked by asserting a signal at the ClearAll2 input 268 of Vbit 172. This can be carried out in a manner independent of other ongoing operations, and in some sense supercedes them all, because it invalidates all the BPC entries.

Already Fetched Instruction Consistency

While all of the above fully handles general consistency issues between the BPC, other caches, and main memory, there remain consistency issues stemming from cases of "store-into-instruction-stream" of an already fetched instruction by the program being executed. In these cases it is entirely possible for a program to modify an instruction and shortly thereafter execute the modified instruction, while in reality, due to the general nature of pipelined CPU designs, this instruction is fetched before the modification actually takes place.

As the addresses for data writes to memory are generated, they are each immediately looked up in the instruction cache and the BPC. If a hit occurs in the instruction cache, the relevant cache entry or line is invalidated so that all future fetches to this line will result in cache misses. The resultant fetch from main memory is then subject to the standard cache consistency protocol and so is guaranteed to eventually obtain the correct values.

In parallel, each store address is presented to the BPC for a consistency check access for an internal write. In the same manner as described earlier, any matches with BPC entries result in invalidation of the associated cached target instructions. This not only eliminates any BPC inconsistencies, but also maintains the BPC target instruction cache as a subset of the instruction cache.

The potentially most difficult part of dealing with store-into-stream is handling the relatively extreme cases in which the modified instruction has been fetched before the store address is generated within the CPU pipeline. In a worse case scenario, the due-to-be-modified instruction immediately and sequentially follows the modifying instruction. In a less extreme case, there may be an intervening branch instruction with the due-to-be-modified instruction as its target.

The former case is a significant problem for CPU designs with even limited degrees of pipelining or instruction processing overlap. As a result, in the context of many architectures, it is accepted by programmers that this is an unreliable manner in which to do store-into-stream.

On the other hand, the latter relatively extreme case is often taken to be reliable. Further, the BPC and the usage of full or aggressive branch prediction greatly exaggerate the degree of the problem by accelerating branch and subsequent instruction processing. The present invention enables this type of case to be simple to handle, even with the effects of the BPC. In the present invention all store-into-stream cases with an intervening branch are properly handled in addition to cases in which there is sufficient distance between sequential modifying and modified instructions so that the above consistency mechanisms can come into play.

The basis for this is the concept of instruction (fetch and execution) streams where such a stream consists of the sequential series of instructions starting with the target of a branch and ending with another branch to a new stream. The fetching and processing of instructions down a new stream is naturally conditional until the initiating branch instruction and all preceding instructions have been sufficiently processed to determine that there are no processing exceptions or faults associated with these instructions and that prediction of the branch was correct in all respects. If some "problem" is detected, then pipeline processing must be appropriately restarted. In the case of a mispredicted branch this would involve partial or complete reprocessing of the branch and flushing of all following instructions from the pipeline.

The present invention extends this to effectively include detection of a store into the stream initiated by a branch as another reason for restarting pipeline processing of that branch. The key point is that the following instructions are then refetched and will now reliably reflect any modifications by instructions preceding the branch. To be reliable, this also requires that branch processing must remain restartable until all preceding stores have been generated, i.e. addresses generated and checked against the BPC.

The present invention further provides an easy, efficient mechanism for detecting stores into a stream based on the integration of the CPU's instruction pre-fetch queues into the BPC. In essence, the target instruction cache portions a small number of BPC lines which are used as pre-fetch queues, one per currently outstanding instruction stream. During such times the BPC lines are marked invalid so as not to be confused with actual valid BPC entries.

This invention takes advantage of the consistency check logic associated with each BPC line and, thus, with each pre-fetch queue. The "target address" values stored in a BPC line serving as a queue are set to correspond to the first two blocks of instructions within the associated stream. As long as the instructions fetched down this stream fall within the first two consecutive or aligned 32 byte blocks and are also within the same page, stores to these instructions can be directly detected. Note that this also covers instructions within the stream which are already being processed within the CPU pipeline, since fetching them does not erase them from the BPC.

When a match occurs between a store address and the target addresses associated with a queue, the queue is flushed, i.e., all the instruction double words are invalidated as for a normal BPC entry, the CPU pipeline flushed, and instruction processing is restarted from the branch. Note that this checking is only performed against the pre-fetch queues associated with the branch instructions which follow the instruction generating the store address being checked. This includes ignoring matches within the queue associated with the instruction stream containing the store instruction.

The only complication with this method for detecting "difficult" store-into-stream cases is when instruction fetching into a queue is about to overflow the first two 32 byte blocks covered by the store detection hardware. Until all stores preceding the branch which initiated this stream have been generated and checked against the BPC, both real entries and the queues, this cannot be allowed. The consistency check logic can only cover the first two aligned 32 byte blocks of fetched instructions.

For this invention a straightforward approach is taken. As long as the branch which initiated a stream remains outstanding, i.e., restartable, fetching of only the first two 32 byte aligned blocks of the stream is allowed. Further fetching is inhibited, if necessary, until the branch has been safely completed. Given the extent of fetching possible before this need occurs, the impact on CPU pipeline performance will generally be minimal.

From an overall perspective, this invention provides for handling "difficult" store-into-stream cases as a simple extension of the mechanisms for maintaining BPC consistency and for supporting full branch prediction and conditional execution of subsequent predicted target instructions. Based on the close association between each instruction stream, the branch which initiated the stream, and the BPC entry or pre-fetch queue supporting fetching down that stream, only modest incremental changes or additions are needed.

The pre-fetch instruction queue is preferably implemented using one of the 36 lines of BTC 180 as shown in FIG. 13. Control state machine 56, shown in FIG. 3, keeps track of which of the 36 lines is the instruction queue. In fact, three lines are used for three queues in the preferred embodiment. In the event a conditional branch is encountered in one queue, that queue is retained while a separate queue for the predicted branch is set up and used. In case the predicted branch turns out to be a mispredicted direction, instruction execution can return to the first queue without having to rewrite it into the BTC. A third queue is provided in case there is a further conditional branch during execution of the second queue. This could result in 3 possible outstanding streams as shown in FIG. 16.

Each queue contains three 8 byte blocks of instructions. The instruction words are provided in order on a 192 bit instruction bus 270 to instruction buffer 153. The words are then aligned by aligner 272 and are provided to instruction register 274 with the instruction aligned to start at the beginning of register 74. The instructions are then provided through an instruction pipeline 276, with each instruction being tagged and tracked as discussed earlier.

Fetching down a queue wraps around and overwrites the three 8 byte blocks irrespective of the processing of the fetched instructions. An 8 byte block is free for overwriting (via a newly fetched block) as soon as the decoder has completely decoded all instructions contained in the block.

However, if a branch is found in a stream, and it is predicted taken, then no further 8 byte blocks will be freed (consumed) in that stream until the branch is completed and found to be not taken. Thus, during the processing of the branch the queue is "frozen". If the branch found in the stream is not taken, then no such restriction exists; the 8 byte block containing the branch may be overwritten before the branch is completed.

A store-into-instruction-stream does not depend on the queue being frozen - the target is refetched.

FIG. 15 shows the logic for detecting a store-into-stream for an instruction queue. For each line in the BPC, the bit output of the 8 latches IL1, FL1-IL4, FL4 of FIG. 12 are provided to one of OR gates 280. The output of an OR gate 280 will indicate that a line is "out" for pointing to a branch target instruction or a queue of instructions following the branch target instruction. The "out" output of each OR gate is provided to an AND gate 282. The other input of the AND gate is the BAC match output for that line. A match output indicates that line has been invalidated as being written over in the instruction cache. If the match output is asserted for a line which is "out", the output of the corresponding AND gate 282 will be asserted as an input to an OR gate 284 and will produce a signal on line 278 indicating an attempt to store-into-stream, i.e., write over a pre-fetched target instruction.

FIG. 14 is a flowchart of the tests performed by control state machine 56 to detect and handle a Store-Into-Instruction-Stream where the instruction is in the pre-fetch queue. The control state machine could implement the flowchart of FIG. 14 in logic or in microcode. The particular manner of implementation is not necessary for an understanding of the invention and would be apparent to one of skill in the art given the disclosure herein.

As shown in FIG. 14, an instruction is fetched from the pre-fetch queue (step A) and processed through the instruction register 182 and instruction pipeline 184 as shown in FIG. 13. Control state machine 56 monitors for any store-into-stream detect signal (step B). If there is none, the control state machine looks to see if the next instruction would be covered by the address in BAC/Tgt CAM 175 (step C). If it would be, it is fetched, otherwise, the state machine waits until the branch is completed to do further fetches (step D).

If there is a store-into-stream detect, it could be any of several queues if there have been multiple branches. Since it is not known which instruction in the queue has been changed, all outstanding queues are assumed to be invalid, including instructions already fetched, and the instruction pipeline is flushed from the first (oldest) branch instruction onward (step E). The target instruction of the oldest branch is then refetched (step F). Since at this point, the valid bit for the target instruction of the branch instruction will have been set to invalid, this refetch will have to go to main memory or the instruction cache to obtain the target instruction and the sequentially following instructions, which will pick up the modified instruction.

As will be understood by those familiar with the art, the present invention may be embodied in other specific forms without departing from the spirit or essential characteristics. For example, the pre-fetch queue need not be located in the BTC. Additional hardware could be used to indicate which branch was the subject of a store-into-stream, instead of flushing all outstanding branch targets. Accordingly, the disclosure of the preferred embodiment of the invention is intended to be illustrative, but not limiting, of the scope of the invention which is set forth in the following claims.

What is claimed is:

1. An apparatus for preventing malfunction of pipeline processing associated with a program that modifies an instruction queued for execution, said apparatus comprising:

an instruction pipeline which performs overlapped processing of a plurality of executing instructions and aborts processing of selected ones Of said executing instructions;

a prefetch buffer, when active said prefetch buffer holding a plurality of instructions queued for possible execution by said pipeline;

an address storage holding a first address value that identifies a block of addressee including said plurality of instructions held in said prefetch buffer;

a comparator having e first input coupled to receive said first address value from said address storage and a second input coupled to receive a second address value from said pipeline; and a control circuit coupled to said comparator and to said pipeline, said control circuit aborting further processing of said selected ones of said executing instructions when said program includes a store instruction and said pipeline generates said second address for said store instruction and said comparator detects that said second address value corresponds to said first address value, thereby restarting said pipeline when said program modifies an instruction in a block of instructions that includes said queued instructions.

2. The apparatus of claim 1 further comprising:

a second profetch buffer, holding, when active, a plurality of instructions queued for possible execution by said pipeline;

said address storage holding a third address value that identifies a second block of addressee including addressee corresponding to said plurality of instructions held in said second prefetch buffer.

3. An apparatus comprising:

a system bus;

an instruction cache, coupled to said system bus, including, for each entry, an instruction address tag, instruction data, and an instruction cache entry validity bit for indicating whether an entry is valid;

means for detecting when a store signal on said system bus matches an instruction address tag for an entry in said instruction cache;

means for setting said instruction cache entry validity bit for an entry in said instruction cache to invalid when said means for detecting detects a store signal on said system bus which matches the instruction address tag for that entry;

a randomly addressable branch prediction cache including, for each entry, a branch instruction address tag, a branch target address, branch target instruction data and a branch prediction cache entry validity bit;

means for comparing an instruction address tag of an instruction cache entry to said branch prediction, cache branch target addresses;

control means for writing target instructions into said branch prediction cache only if said instructions are also written into said instruction cache and for removing target instructions from said branch prediction cache whenever said instructions are removed from said instruction cache; and means for setting said branch prediction cache entry validity bit for a branch prediction cache entry to invalid when the branch target address matches the address of an instruction cache entry with said instruction cache entry validity bit in an invalid state;

such that a store-into-instruction-stream will be detected by said instruction cache and will result in the invalidation of any corresponding entries in both said instruction cache and said branch prediction cache.

4. The apparatus of claim 3 wherein said instruction cache further includes an attention bit for each entry and control means for setting said attention bit, said attention bit being set by said control means only when said entry is also written into said branch prediction cache, said control means causing said branch target addresses to be compared to said instruction cache entry address tags when said instruction cache entry has its instruction cache entry validity bit set to an invalid state and said attention bit is set.

5. The apparatus of claim 3 wherein said instruction cache is direct-mapped and said branch prediction cache is fully associative.

6. The apparatus of claim 5 further comprising means for comparing the index bits of an address for an instruction block being written into said instruction cache to said branch target addresses and invalidating any, branch prediction cache entry having a match.

7. An apparatus for preventing malfunction of pipeline processing associated with a program that modifies an instruction queued for execution, said apparatus comprising:

an instruction pipeline which performs overlapped processing of a plurality of executing instructions and aborts processing of selected ones of said executing instructions;

a profetch buffer, when active said profetch buffer holding a plurality of instructions queued for possible execution by said pipeline;

an address storage holding a first address value that identifies a block of addresses including said plurality of instructions held in said profetch buffer;

a comparator having a first input coupled to receive said first address value from said address storage and a second input coupled to receive a second address value from said pipeline; and a control circuit coupled to said comparator and to said pipeline said control circuit aborting further processing of said selected ones of said executing instructions when said program includes a store instruction and said pipeline generates said second address for said store instruction and said comparator detects that said second address value corresponds to said first address value, thereby restarting said pipeline when said program modifies an instruction in a block of instructions that includes said queued instructions;

wherein said block of instructions consists of 32 bytes and said address values each consist of at least 27 bit.

8. The apparatus of claim 7 wherein said pro-fetch buffer is located in a branch prediction cache.

9. The apparatus of claim 7 further comprising validity bits for said instructions in said pre-fetch buffer.

10. An apparatus comprising:

an instruction pipeline for overlapping execution of a plurality of sequential instructions;

a pre-fetch queue for holding a plurality of instructions to be executed;

means for detecting a store to an address for a given instruction in said pre-fetch queue and generating a store-into-instruction-stream signal;

control means for flushing and restarting said instruction pipeline when said store-into-instruction-stream signal is detected from at least said given instruction onward;

an instruction cache holding a plurality of instruction entries, each instruction entry having an instruction address tag, instruction data and an entry validity bit for indicating whether a corresponding instruction is valid;

means for setting said entry validity bit to invalid when a store is detected to an address matching the instruction address tag; and a branch prediction cache holding a plurality of branch instruction addresses, wherein said branch prediction cache includes a branch validity bit for each of said branch instruction addresses, and further comprising means for setting said branch validity bit to invalid when a store is detected to an address matching the branch instruction address.

11. The apparatus of claim 1 wherein said pre-fetch buffer is located in a branch prediction cache.

* * * * *